United States Patent
Howieson et al.

(10) Patent No.: US 9,405,029 B2
(45) Date of Patent: *Aug. 2, 2016

(54) WIDE AZIMUTH SEISMIC DATA ACQUISITION METHOD AND SYSTEM SKIPPING LINES

(71) Applicant: CGG SERVICES SA, Massy (FR)

(72) Inventors: Bill Howieson, Sugar Land, TX (US); Andrew Feltham, Houston, TX (US)

(73) Assignee: CGG SERVICES SA, Massy (FR)

( * ) Notice: Subject to any disclaimer, the term of this patent is extended or adjusted under 35 U.S.C. 154(b) by 263 days.

This patent is subject to a terminal disclaimer.

(21) Appl. No.: 14/138,946

(22) Filed: Dec. 23, 2013

(65) Prior Publication Data

US 2014/0376331 A1    Dec. 25, 2014

Related U.S. Application Data

(60) Provisional application No. 61/836,733, filed on Jun. 19, 2013, provisional application No. 61/836,729, filed on Jun. 19, 2013, provisional application No. 61/839,039, filed on Jun. 25, 2013.

(51) Int. Cl.
*G01V 1/38* (2006.01)
(52) U.S. Cl.
CPC ................................... *G01V 1/3808* (2013.01)
(58) Field of Classification Search
CPC .................................................. G01V 1/3808
USPC .......................................................... 367/20
See application file for complete search history.

(56) References Cited

U.S. PATENT DOCUMENTS

| | | | | |
|---|---|---|---|---|
| 3,506,955 A * | 4/1970 | Schneider | .............. | G01V 1/005 367/23 |
| 4,209,843 A * | 6/1980 | Hyatt | .................. | B60R 16/0373 708/422 |
| 6,028,817 A * | 2/2000 | Ambs | .................. | G01V 1/3808 367/16 |
| 7,466,632 B1 * | 12/2008 | Sorli | .................... | G01V 1/3861 181/118 |
| 7,505,362 B2 * | 3/2009 | Anderson | ................ | G01V 1/28 367/53 |
| 2008/0267010 A1 * | 10/2008 | Moldoveau | .............. | G01V 1/38 367/16 |
| 2011/0158044 A1 * | 6/2011 | Moldoveanu | ........ | G01V 1/3808 367/20 |
| 2014/0376330 A1 * | 12/2014 | Howieson | ............ | G01V 1/3808 367/20 |

OTHER PUBLICATIONS

"Meaning—When is between inclusive and when exclusive," 2015, downloaded Nov. 26, 2015 from http://english.stackexchange.com/questions/118402/when-is-between-inclusive-and-when-exclusive.*

* cited by examiner

*Primary Examiner* — Daniel L Murphy

(74) *Attorney, Agent, or Firm* — Patent Portfolio Builders PLLC

(57) ABSTRACT

Wide azimuth data acquisition systems using at least three streamer sets achieve shorter survey time and enhanced angular coverage relative to conventional systems using two streamer sets. Various techniques such as high-density seismic source activation and alternating surveyed bands with skipped bands lead to data quality similar to the conventional system, while maintaining the increased productivity advantage.

20 Claims, 30 Drawing Sheets

Figure 4

| S1R1 | S2R1 | S3R1 | S4R1 | S1R5 / S5R1 | S2R5 | S3R5 | S4R5 | S5R5 |

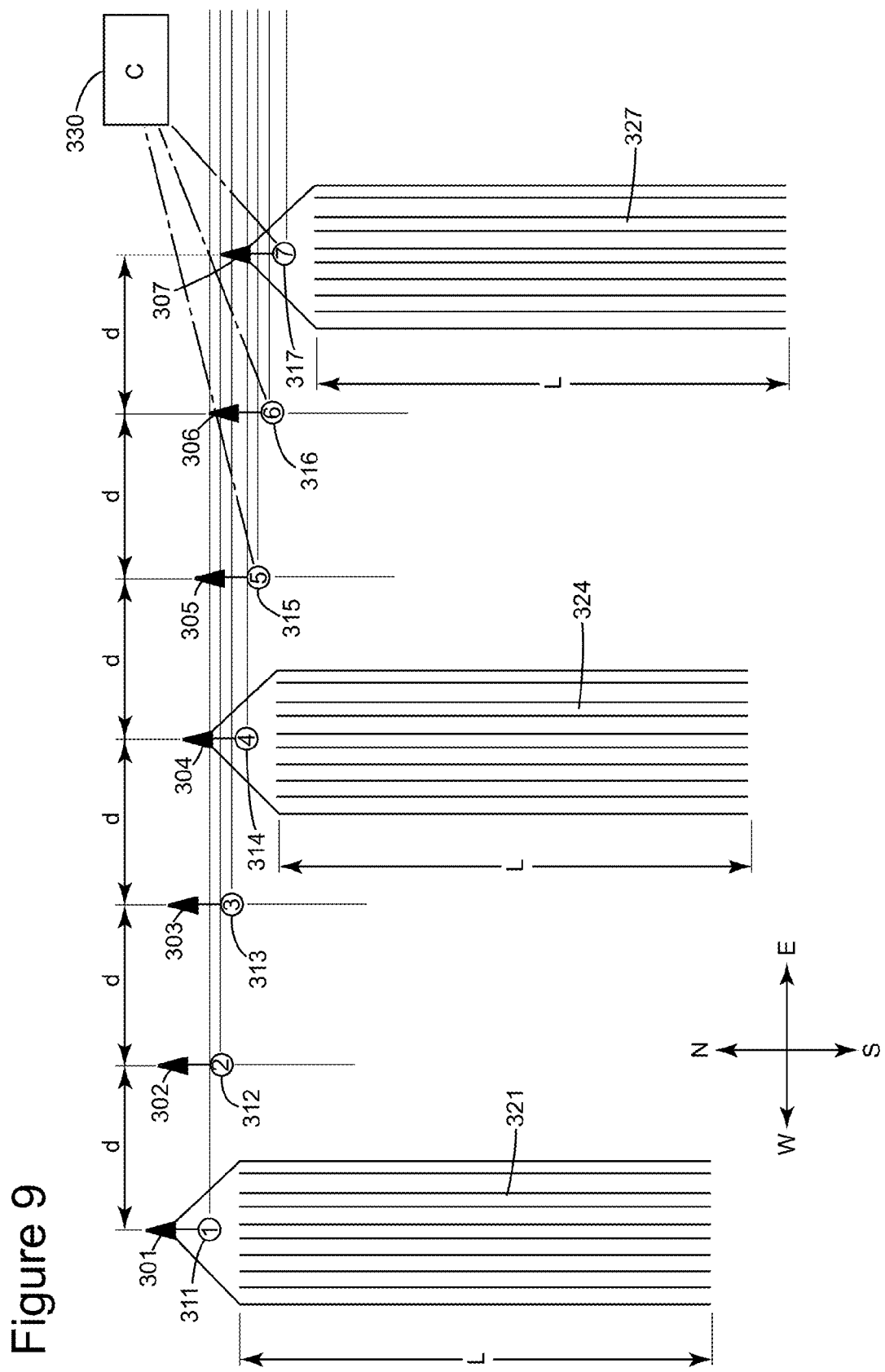

Figure 25

| Tow Speed (kts) | Tow Speed (m/s) | 31.25m SP duration (sec) | 25m SP duration (sec) | 18.75m SP duration (sec) |
|---|---|---|---|---|
| 4.0 | 2.058 | 15.186 | 12.148 | 9.112 |
| 4.1 | 2.109 | 14.816 | | |
| 4.2 | 2.161 | 14.463 | | |
| 4.3 | 2.212 | 14.127 | | |
| 4.4 | 2.264 | 13.806 | | |
| 4.5 | 2.315 | 13.499 | 10.799 | 8.100 |
| 4.6 | 2.366 | 13.206 | | |
| 4.7 | 2.418 | 12.925 | | |
| 4.8 | 2.469 | 12.655 | | |
| 4.9 | 2.521 | 12.397 | | |
| 5.0 | 2.572 | 12.149 | 9.719 | 7.289 |

Figure 33

| System/Method | Full/max azimuth | No. Sources | Inline Step/Super-Shot Distance (m) | Interval Subsequent Source Activation(s) | Inline Fold | xline Fold | Total Fold | Survey Time |
|---|---|---|---|---|---|---|---|---|
| Conventional | 5340/5340 | 5 | 31.25/156.25 | 13.5 | 25.92 | 4-5 | 104-130 | T |
| System 300 HD Activation | Missing Minimum Offsets | 7 | 31.25/218.75 | 13.5 | 18.51 | 5-6 | 93-111 | T/2 |
| System 300 Cyclical Surveying/Skipping Cross-Bands (1) | 4140/7740 | 7 | 31.25/218.75 | 13.5 | 18.51 | 5-6 | 93-111 | T/2 |
| System 300 Cyclical Surveying/Skipping Cross-Bands (2) | 4140/7740 | 7 | 25.00/175.00 | 10.9 | 23.14 | 5-6 | 116-139 | T/2 |
| System 300 Cyclical Surveying/Skipping Cross-Bands (3) | 4140/7740 | 7 | 18.75/131.5 | 8.2 | 30.8 | 5-6 | 154-185 | T/2 |
| System 800 Cyclical Surveying/Skipping Cross-Bands | 5340/10140 | 9 | 18.75/168.75 | 8.2 | 24 | 7-8 | 168-192 | T/2 |

WIDE AZIMUTH SEISMIC DATA ACQUISITION METHOD AND SYSTEM SKIPPING LINES

CROSS REFERENCE TO RELATED APPLICATIONS

This application claims priority and benefit from U.S. Provisional Patent Application No. 61/836,729, filed Jun. 19, 2013, for "GARGANTUSEIS," U.S. Provisional Patent Application No. 61/836,733, filed Jun. 19, 2013, for "GARGANTUWATS," and U.S. Provisional Patent Application No. 61/839,039, filed Jun. 25, 2013, for "MEGAWATS—A DEVELOPMENT OF GARGANTUWATS TO PROVIDE A MINIMUM OFFSET DATA FOR PROCESSING," the entire contents of which are incorporated in their entirety herein by reference.

TECHNICAL FIELD

Embodiments of the subject matter disclosed herein generally relate to methods and systems used for seismic data acquisition, and, more particularly, for wide azimuth seismic data acquisition.

BACKGROUND

Seismic exploration of subsurface geophysical structures on land and offshore is a widely used technique for searching for oil or gas. Specifically, reflection seismology is a method of geophysical exploration used to image the subsurface structure in order to evaluate whether oil and/or gas reservoirs may be present. There is continual interest in obtaining better images of the subsurface structure, based on shorter surveying periods.

In reflection seismology, seismic waves are artificially generated and directed toward the explored subsurface structure. In a marine setting, reflected compressional waves recorded by hydrophones and/or accelerometers are widely used. In other settings (e.g., land and ocean-bottom surveys), information on reflected shear waves may also be acquired. Analysis of the arrival times and amplitudes of these reflected waves is the basis for generating an image of geological layers.

FIG. 1 is a bird's-eye view of a data acquisition system 10 used in marine seismic explorations. The term "marine" is not limited to sea or ocean environments, but such systems may be used in any large bodies of water (e.g., freshwater lakes). The data acquisition system 10 includes a ship 2 towing plural streamers 4 (also known as spreads) that may extend over kilometers behind ship 2. Seismic detectors 6 (only a few are labeled) are disposed along streamers 4. Each streamer 4 has attached positioning devices (not shown) such as birds, floaters, deflectors, etc., configured and operated to maintain the towed streamers' geometry (i.e., each streamer's depth profile and all streamers parallel to one another). Ship 2 may also tow one or more seismic sources 8 (which may include plural source arrays) configured to generate seismic waves. A distance between source 8 and the first seismic detectors on streamers 4 may be a few hundred meters, while streamer length may be up to 10 kilometers. The seismic waves generated by source 8 propagate downward to partially reflect off of, and penetrate, the seafloor. Seismic waves penetrating the seafloor may then be reflected by one or more reflecting structures, such as layer interfaces (not shown in FIG. 1) inside the explored underground structure. The reflected seismic waves travel upward and may be detected by seismic detectors 6. When the same ship tows the seismic source and the streamers along a sail-line S, the acquired data has a narrow, limited azimuth angle range. At the front of the spread, the azimuth can be 75° but rapidly decreases to less than 10°. Azimuth (e.g., $\alpha$ in FIG. 1) is defined in a horizontal plane relative to a towing direction such that if a seismic detector is positioned behind the source in a first towing direction the azimuth angle is 0°. Note that if data is acquired while covering the same surface area while towing the system back and forth, the azimuth definition is maintained. Therefore, when the system is towed in a second direction opposite to the first direction, if a seismic detector is positioned behind the source, the azimuth angle is 180°. Thus, data acquired while the system is towed in the first direction corresponds to an azimuth range of 0°±75° and data acquired covering while the system is towed in the second direction corresponds to an azimuth range of 180°±75°.

To achieve higher-resolution images of the subsurface, a wide azimuth (WAZ) data acquisition technique has been developed in the past years. Using this technique, one or more seismic sources are towed laterally relative to the ship towing the streamer set carrying the detectors.

Use of conventional WAZ data acquisition systems has proven to be challenging because weather time windows in which to perform seismic surveys may be scarce and short. If the target area is large, a WAZ survey may not be completed in one season and may require survey campaigns spanning multiple years. Given the large amount of equipment and large number of personnel involved, WAZ surveys are also expensive. The costs and uncertainty of completing a WAZ acquisition may then render WAZ seismic surveys unattractive, if at all feasible.

Therefore, it is desirable to provide WAZ methods and seismic data acquisition systems that shorten WAZ survey duration without compromising, and potentially improving, seismic data quality.

SUMMARY

In some embodiments, WAZ survey duration is decreased by using a data acquisition system that includes three streamer sets with seismic sources distributed cross-line between the streamer sets.

According to an embodiment, there is a method for wide azimuth seismic data acquisition that includes towing, along an inline direction, a seismic data acquisition system. The seismic data acquisition system has seismic sources, and three streamer sets. The seismic sources are distributed in a cross-line direction with a predetermined step, the cross-line direction being substantially perpendicular to the inline direction. The first streamer set and the second streamer set are towed behind first and second outer seismic sources of the seismic sources, respectively. The third streamer set is towed behind a third middle source. The method further includes activating the seismic sources and acquiring seismic data using detectors carried by the first, second and third streamer sets.

According to another embodiment, there is a method for seismic data acquisition including towing, back and forth in an inline direction, a seismic data acquisition system. The seismic data acquisition system has seismic sources, and three streamer sets. The seismic sources are distributed in a cross-line direction with a predetermined step, the cross-line direction being substantially perpendicular to the inline direction. The first streamer set and the second streamer set are towed behind first and second outer seismic sources of the seismic sources, respectively. The third streamer set is towed behind a third middle source. The method further includes activating the seismic sources such that the seismic sources to be activated at substantially same super-shot positions in the inline direction and acquiring seismic data using detectors carried by the first, second and third streamer sets. The method also includes shifting the seismic data acquisition system, in the cross-line direction, when switching heading, (A) a first distance that is substantially equal to a half of the predetermined cross-line distance between adjacent seismic sources for a predetermined number of times, and (B) then once a second distance that is a multiple of the predetermined cross-line distance.

According to another embodiment, there is a seismic data acquisition system configured to be towed in an inline direction and including seismic sources, three streamer sets and a controller. The seismic sources are distributed along a cross-line direction with a predetermined step, the cross-line direction being substantially perpendicular to the inline direction. The first streamer and the second streamer are towed behind a first and a second outer seismic source of the seismic sources, respectively. The third streamer is towed behind a third middle source among the seismic sources. The controller is configured to activate the seismic sources at predetermined super-shot positions in the inline direction.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 4 is cross-line record resulting from a super-shot gather using the conventional WAZ data acquisition system;

FIG. 9 is a diagram of a WAZ data acquisition system according to an embodiment;

FIG. 25 is a table showing the correlation between tow speed, the inline step, and a portion of a listening time without overlap with another listening time;

FIG. 33 is a table summarizing features of different WAZ data acquisition systems.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed using terminology of a marine seismic data acquisition system. However, concepts related to wide azimuth data acquisition described relative to marine data acquisition may also be pertinent to land-based wide azimuth data acquisition.

Reference throughout the specification to "one embodiment" or "an embodiment" means that a particular feature, structure or characteristic described in connection with an embodiment is included in at least one embodiment of the subject matter disclosed. Thus, the appearance of phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a method for wide azimuth (WAZ) seismic data acquisition is based on towing inline a seismic data acquisition system that includes seismic sources (e.g., source arrays including plural air-guns or marine vibrators) distributed uniformly cross-line and at least three streamer sets towed behind some of the seismic sources. The seismic sources are activated at predetermined positions and detectors (e.g., hydrophones, geophones, accelerometers, etc.) on the three streamer sets acquire seismic data. The use of WAZ data acquisition systems, including at least three streamer sets and associated methods, lead to a substantially decreased survey period compared to using a conventional WAZ data acquisition systems, with wider angular coverage as now discussed.

Figure 1:
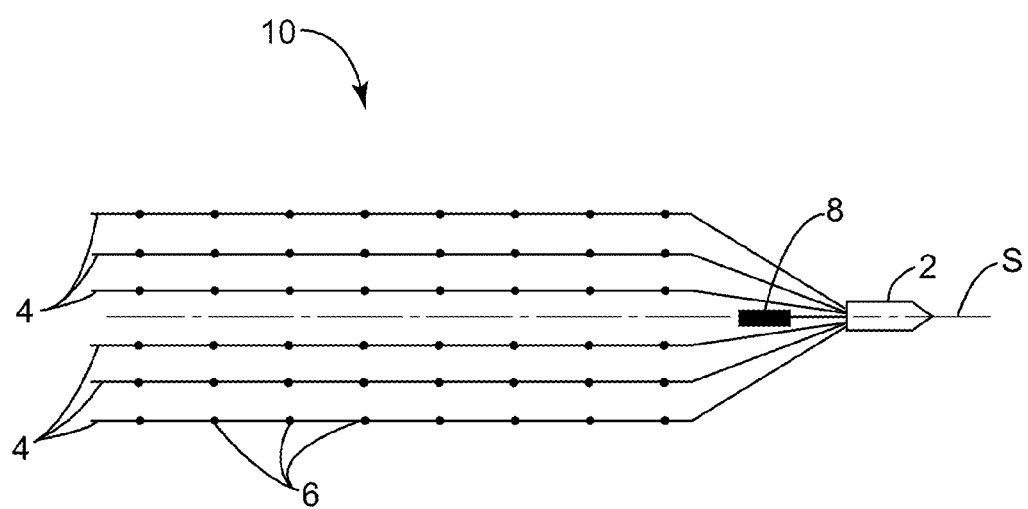
FIG. 1 is a view of a narrow azimuth data acquisition configuration.
Figure 2:
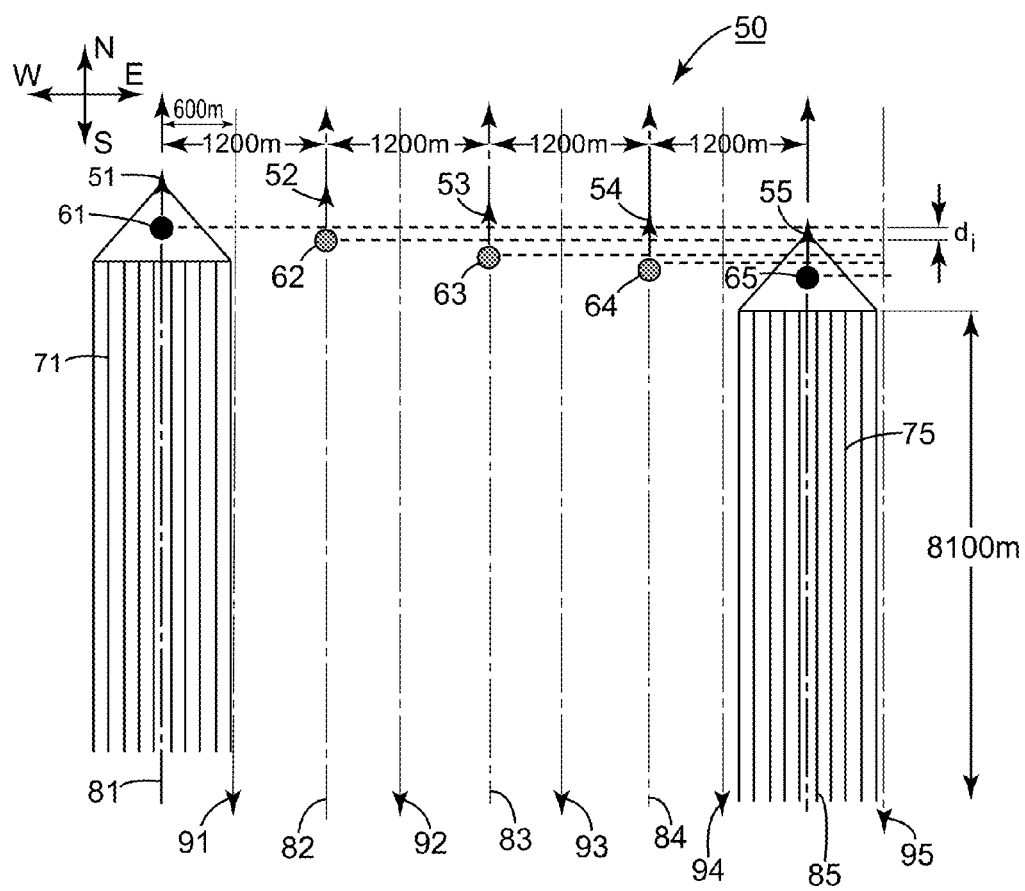
FIG. 2 illustrates a conventional wide azimuth (WAZ) data acquisition system.

FIG. 2 is a bird's-eye view of a conventional WAZ data acquisition system 50. System 50 includes five vessels (51, 52, 53, 54, 55), with each towing, respectively, a seismic source (61, 62, 63, 64, 65). The seismic sources are towed about 1,200 m from one another along a cross-line direction (the cross-line being substantially perpendicular to the vessels' sail lines). Vessels 51 and 55 also tow streamer sets 71 and 75, each at about 400 m behind corresponding seismic sources 61 and 65. Streamer sets 71 and 75 each include ten individual streamers about 8,100 m long. Inter-streamer distance may be about 120 m, yielding a total spread (i.e., width perpendicular to sail-lines) of 1,080 m.

Typical towing speed is about 4.5 knots (i.e., about 0.514 m/s×4.5=2.313 m/s). After one source is activated, seismic data is acquired for about 13.5 s. Sources 61-65 are activated to emit seismic waves at about the same inline position, which is known as a "super-shot position." The sources are towed at an inline step (also known as the "stagger") of about 31.25 m, which is the distance the data acquisition system advances while acquiring data after a shot (i.e., one seismic source's activation). After an interval of 13.5 s, another seismic source located at the super-shot position is activated. After all seismic sources are fired at one super-shot position, the seismic source that fired first is activated at a next super-shot position. Thus, when sources are fired one-by-one, a distance between super-shot positions is 31.25 m×5=156.25 m (where 5 is the number of sources).

Figure 3A:
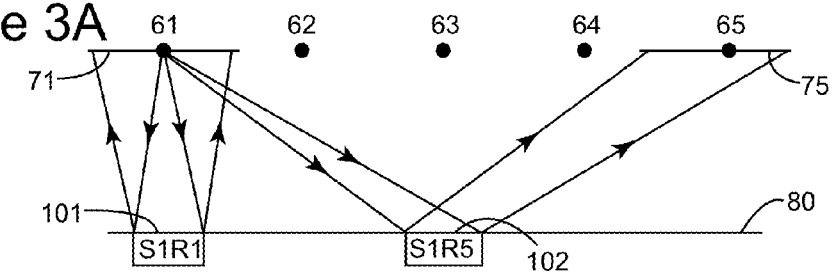
FIGS. 3A-3E are diagrams illustrating cross-line coverage achieved with the conventional WAZ data acquisition system.

FIGS. 3A-3E are vertical plane views schematically illustrating seismic waves paths to areas on the seafloor 80 (for simplicity, the seafloor is considered flat and horizontal) reflecting seismic waves when different sources are activated at the same super-shot position. When seismic source 61 is activated as illustrated in FIG. 3A, the seismic waves are partially reflected by area 101 and are then detected by streamer set 71. The seismic waves from source 61 are also reflected by area 102 and detected by streamer set 75. In FIGS. 3A-3E, any source-receiver combination (also known as a "tile") is labeled to indicate the activated seismic source (S1-S5) and the streamer set (R1 or R5). For example, S1R5 indicates that streamer set 75 detected reflected waves after seismic source 61 was activated.

Figure 3B:
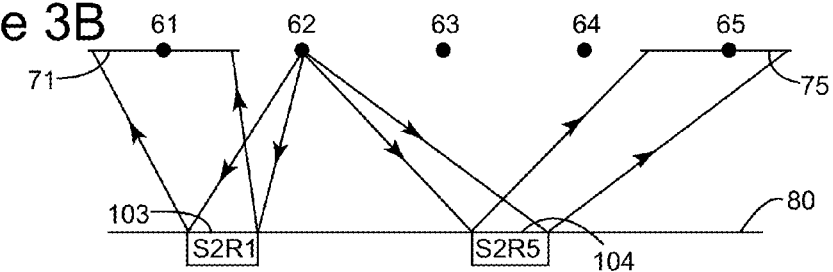
Figure 3C:
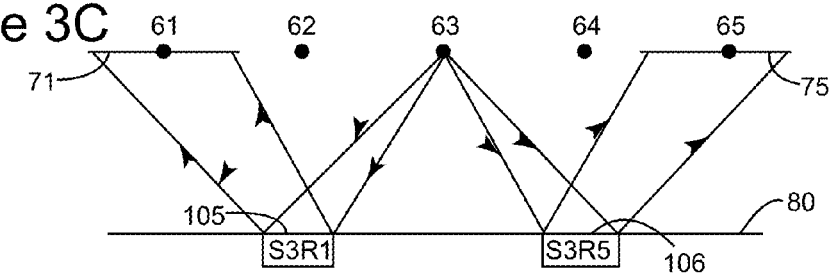
Figure 3D:
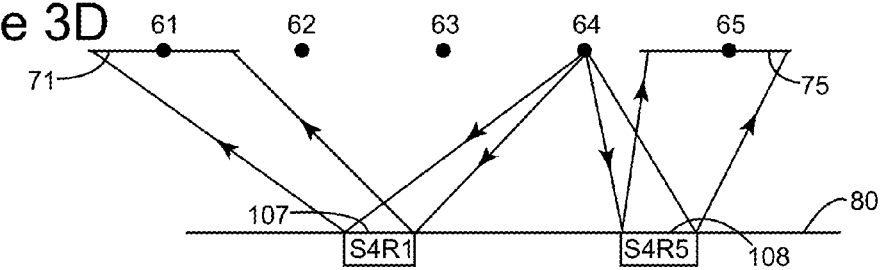
Figure 3E:
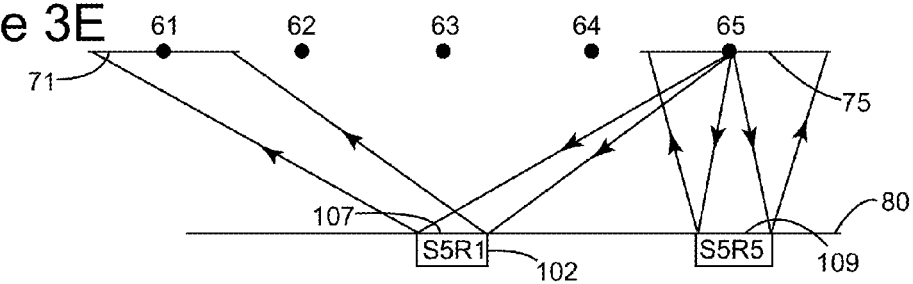

When seismic source 62 is activated as illustrated in FIG. 3B, seismic waves are partially reflected by area 103 to be detected by streamer set 71, and by area 104 to be detected by streamer set 75 detectors. FIGS. 3C-E illustrate the same for sources 63-65.

FIG. 4 illustrate a cross-line record 99 corresponding to a super-shot gather (i.e., all seismic data collected when each source is shot at a given super-shot position).

Returning to FIG. 2, vessels 51-55 follow sail lines 81-85 when system 50 is towed to head in a first direction (e.g., S→N). System 50 is then towed in a second direction (e.g., N→S), which is anti-parallel to the first direction, with vessels 51-55 following sail-lines 91-95. Every time the heading is switched, system 50 is shifted with 600 m in the cross-line direction (e.g., toward E).

Figure 5:
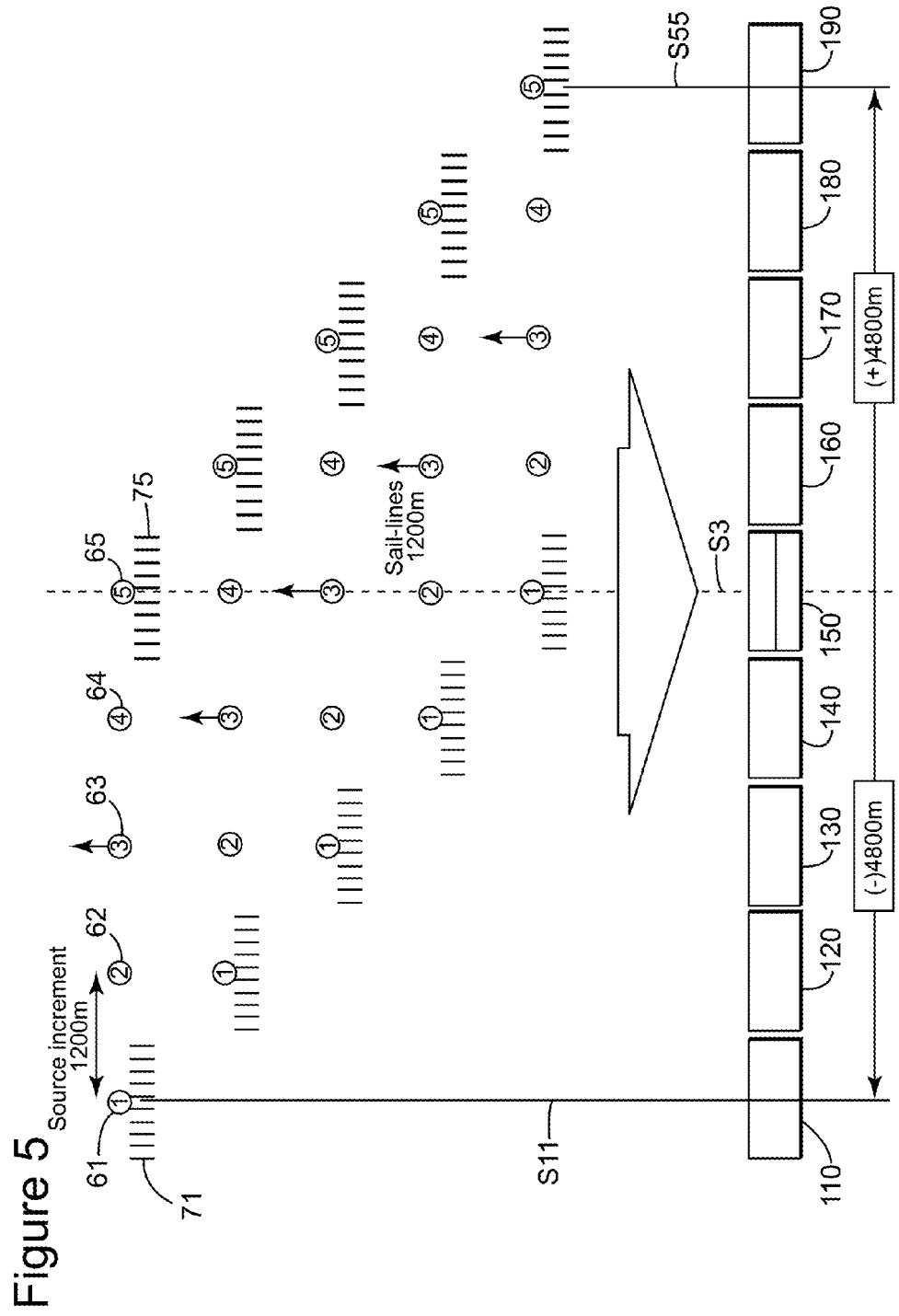
FIG. 5 is a diagram illustrating surface coverage achieved with the conventional WAZ data acquisition system.

FIG. 5 illustrates surface coverage resulting from successive passes in the same direction (e.g., first direction S→N), with 1,200 m cross-line shift from one towing to the next. Each row in FIG. 5 shows data acquisition system placement in the cross-line direction for one pass. In FIG. 5, sources 61-65 and streamer sets 71 and 75 are only labeled in the first row.

During a first pass (illustrated by FIG. 5's upper row) and considering source 65, streamer set 71 is towed to cover surface area 110 and acquires widest azimuth data westward relative to middle line $S_3$ while streamer set 75 is towed to cover surface area 150 and acquires narrow azimuth data. Then, during a second pass (illustrated in FIG. 5's second row), streamer set 71 is towed to cover surface area 120, and streamer set 75 is towed to cover surface area 160. Similarly, during a third pass, streamer sets 71 and 75 are towed to cover surface areas 130 and 170, and, during a fourth pass, surface areas 140 and 180. During a fifth pass, streamer set 71 is towed to cover surface area 150 collecting narrow azimuth data, and streamer set 75 is towed to cover surface area 190 being positioned to collect widest azimuth data eastward relative to middle line $S_3$ when source 61 is fired. Thus, during the five passes illustrated in FIG. 5, the streamer sets collect data while sweeping a surface area extending from −5,340 m ($S_{11}$ at −4,800 m being the sail line of streamer set 71 during the first pass, plus the additional half-streamer spread extending at left of $S_{11}$ for 1,080/2 m) to +5,340 m ($S_{55}$ at 4,800 being the sail line of streamer set 75 during the fifth pass, plus the additional half-streamer spread extending at right of $S_{55}$ for 1,080/2 m) relative to middle line $S_3$.

Figure 6:
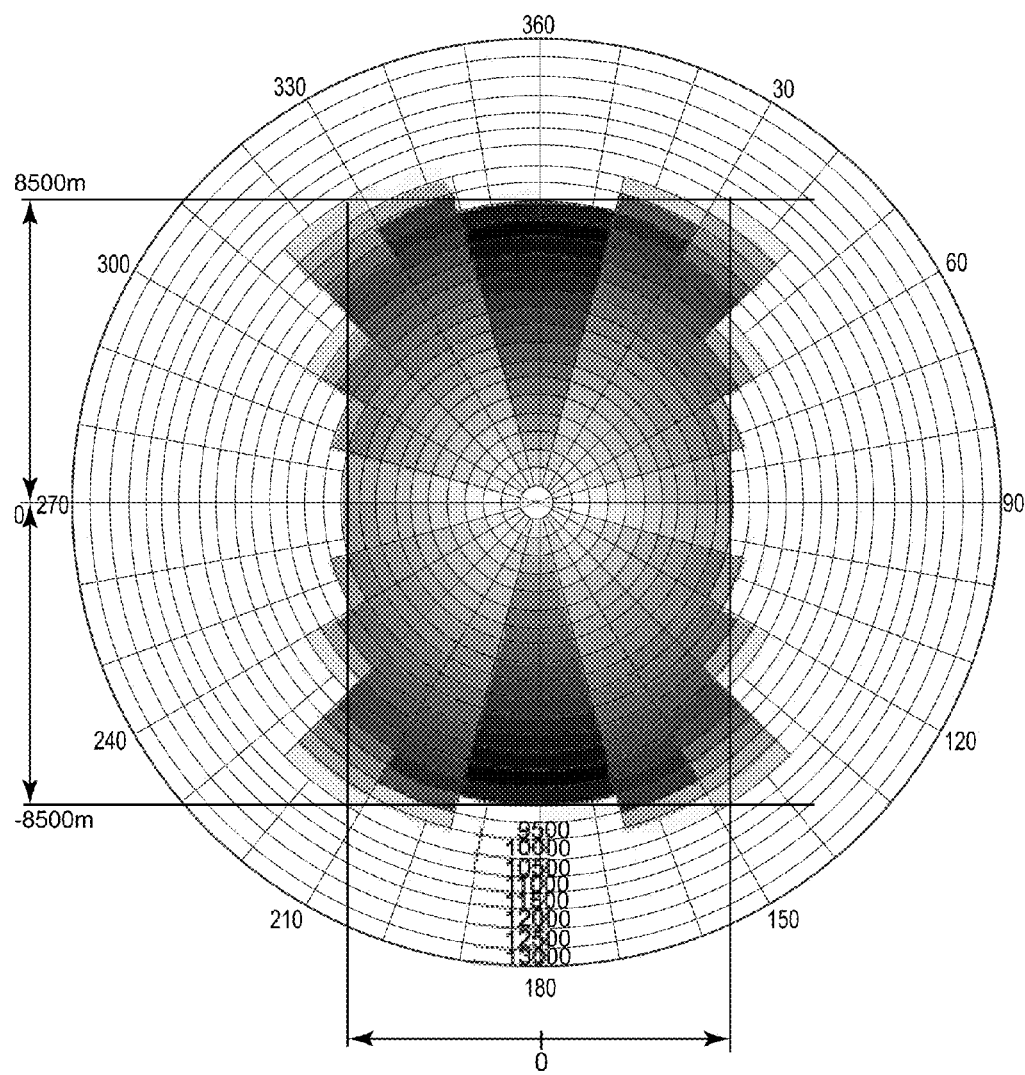
FIG. 6 is a graph illustrating angular distribution of data acquired using the conventional WAZ data acquisition system.

FIG. 6 illustrates angular coverage achieved with conventional WAZ data acquisition system 50. Data acquisition reference length is about 8,500 m. FIG. 6 illustrates data acquired when the seismic data acquisition system is towed both in a first direction (e.g., S→N, which case is illustrated in FIG. 5) and in a second direction, opposite to the first direction (e.g., N→S). Therefore, the graph shows bins covering ±8,500 m. As previously discussed relative to FIG. 5, data acquisition width is ±5340 m. The circles around a central point O correspond to distances in increments of 500 m. Angular bins spanning 15° radial around point O have a shade of gray correlated with the number of traces in that bin. The darker the bin, the more traces corresponding to that bin have been detected.

Another way to look at WAZ data is to consider when the same area 200 on the seafloor 80 is illuminated during a seismic survey, as illustrated in FIGS. 7A-7E and 8A-8E.

Figure 7A:
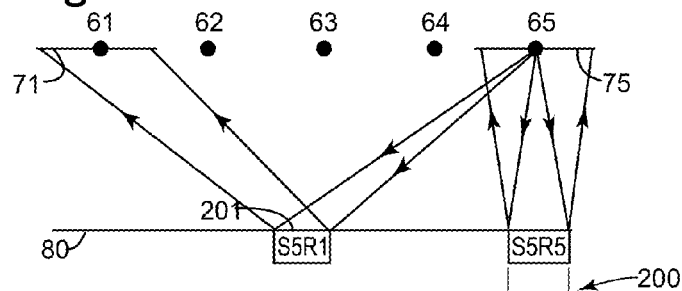
FIGS. 7A-7E and 8A-8D are diagrams illustrating inline coverage achieved with the conventional WAZ data acquisition system.

FIGS. 7A-7E illustrates the manner in which seafloor area 200 is illuminated while system 50 is towed in the first direction, S→N (similar to FIG. 5). FIG. 7A represents areas illuminated when source 65 is activated. Streamer set 75 detects seismic waves reflected from area 200, acquiring data tile S5R5 (i.e., seismic source 65, and streamer set 75). Also streamer set 71 detects seismic waves reflected from another area 201. For simplicity, the other areas illuminated together with area 200 are not marked in FIGS. 7B-E and 8A-D.

Figure 7B:
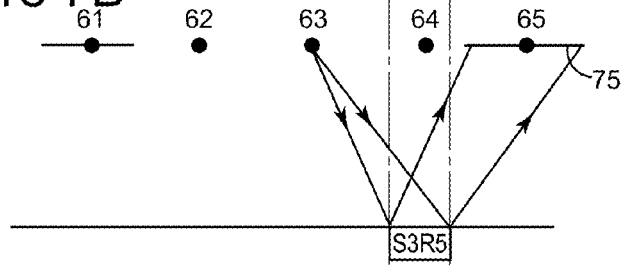
Figure 7C:
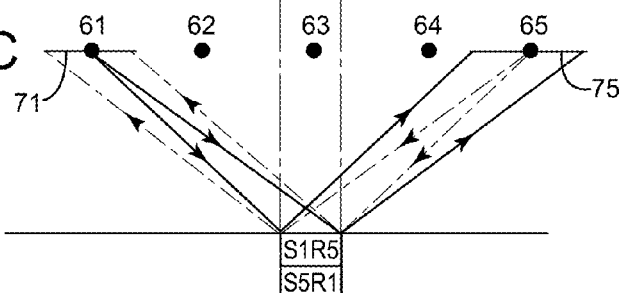
Figure 7D:
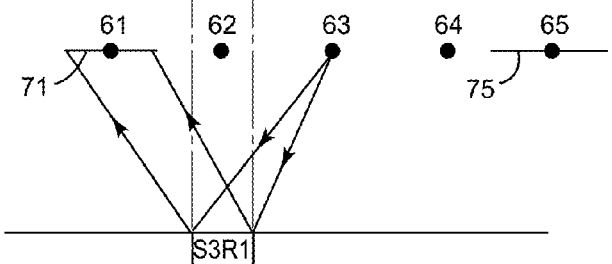
Figure 7E:
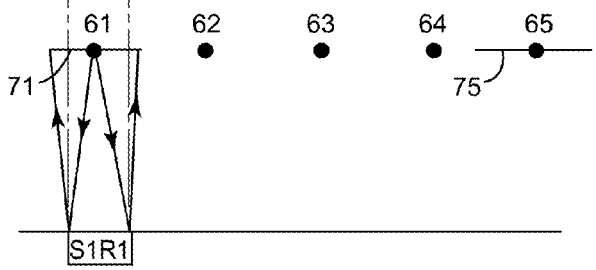

Further, a next pass in the same first direction (S→N) as the pass illustrated in FIG. 7A is illustrated in FIG. 7B. During this second pass, area 200 is illuminated when source 63 is activated and reflected waves are detected by streamer set 75 (i.e., tile S3R5). Similarly, FIGS. 7C-E illustrate acquiring tiles S5R1 and S1R5, S3R1, and S1R1, respectively, while illuminating area 200. Note that tiles S1R1 and S5R5 refer in fact to the same source-receiver geometry.

Figure 8A:
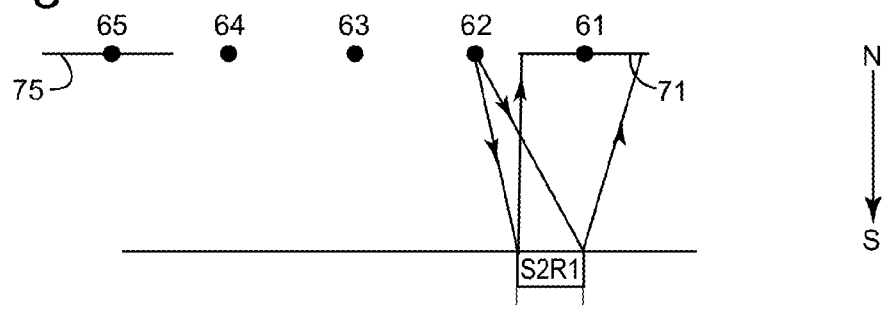
Figure 8B:
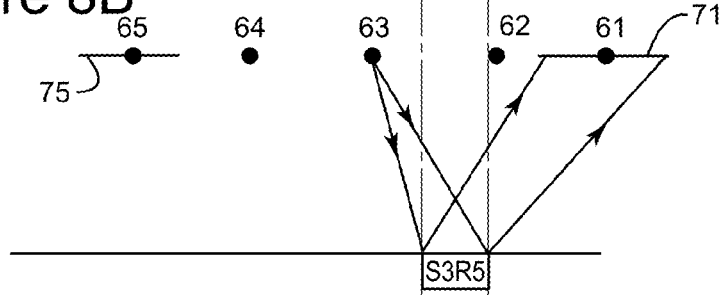
Figure 8C:
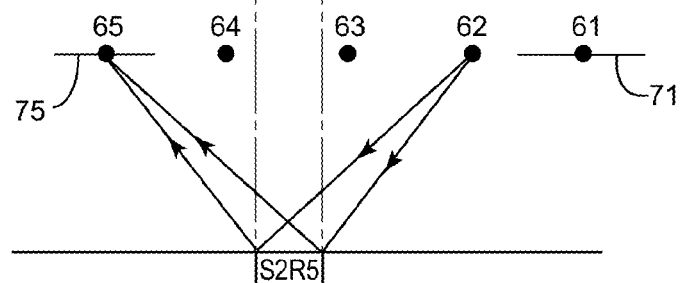
Figure 8D:
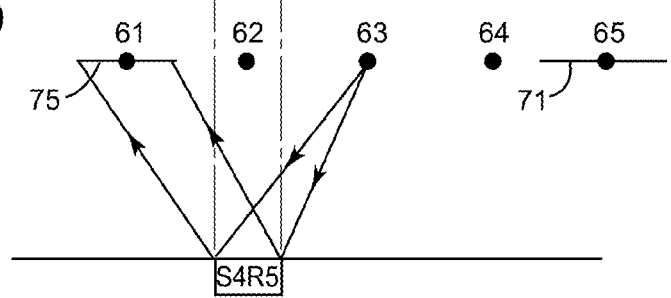

FIGS. 8A-D illustrate illuminating area 200 while system 50 is towed heading in the second towing direction, N→S. When the data acquisition system is towed in this second direction, source 65 and streamer set 75 assume the leftmost (West-most) cross-line position. In the first pass (illustrated in FIG. 8A), area 200 is illuminated when source 62 is activated and reflected waves are detected by streamer set 71 (i.e., tile S2R1). During a second pass (illustrated in FIG. 8B), area 200 is illuminated when source 64 is activated and reflected waves are detected by streamer set 71 (i.e., tile S4R1). Similarly, FIGS. 8C and 8E illustrate acquiring tiles S2R5 and S4R5. Thus, nine different tiles are collected during the nine passes described above.

A measure of data coverage is the total fold, which is a product of the inline fold and the cross-line fold for the acquired data. For system 50, the cross-line fold is 9 because record 99 illustrated in FIG. 4 has data corresponding to nine different source-receiver combinations for a single super-shot position.

The inline fold is calculated based on the following formula:

$$InlineFold = \frac{NumberChannels \times ChannelSeparation}{2 \times SuperShotSeparation}. \quad (1)$$

For a channel separation of 12.5 m along an 8,100 m long streamer, the number of channels is 8,100/12.5=648 channels. The numerator of formula (1) equals, in fact, the streamer's length. Distance between consecutive super-shot positions (SuperShotSeparation) is determined by the towing speed (e.g., 4.5 knots=4.5×0.514 m/s=2.313 m/s), listening time (e.g., 13.5 s) following each individual shot, and number of shots in each cycle (e.g., at each super-shot position). If the seismic sources are towed at predetermined inline intervals so as to be activated at the same inline level (i.e., super-shot position) one after another, a distance between consecutive super-shots is 5×2.313 ms$^{-1}$×13.5 s=156.25 m.

Thus, using equation (1), InlineFold=25.92 and Total fold=233.28 for conventional WAZ data acquisition system 50.

(GargantuWATS)

With this background information, novel WAZ systems and methods are now discussed. FIG. 9 is a bird's-eye view of a WAZ data acquisition system 300 according to an embodiment. System 300 includes seven vessels, 301-307. The vessels move inline (e.g., in S→N direction) at substantially equal predetermined distances d (e.g., 1,200 m) in the cross-line direction. Each vessel tows a corresponding seismic source 311-317. Vessels 301, 304 and 307 also tow streamer sets 321, 324 and 327 behind seismic sources 311, 314 and 317, respectively. Streamer sets 321, 324 and 327 may have substantially the same geometry. For example, each of the streamer sets may include ten individual streamers about 8,100 m long, with a cross-line separation between streamers of about 120 m. In another example, each streamer set may include twelve streamers about 100 m from one another. Other configurations may be used depending on the seismic survey.

The seismic sources may also be towed at equal inline distances (e.g., at an inline step i of about 31.25 m) and be activated sequentially so that all seismic sources are activated substantially at the same inline super-shot positions.

Two of the streamer sets, 321 and 327, are towed behind the outer sources, 311 and 317, while a third streamer set, 324, is towed behind a middle source, 314. The symmetry of this arrangement makes it easier to process the acquired WAZ seismic data. However, the arrangement is not intended to be limiting, with symmetry being a feature rather than a limitation. For example, another seismic source may be towed cross-line outside this arrangement. In another example, the third streamer set may be towed behind a seismic source other than middle source 314. System 300 may also include a controller 330 configured to activate the seismic sources at predetermined super-shot positions in the inline direction. Controller 330 may be located on one of the vessels, or may be composed of plural hardware elements distributed at different locations (e.g., on the vessels or directly attached to the seismic sources) cooperating to activate the seismic sources in the desired manner. In one embodiment, one streamer vessel is master vessel, the other vessels being positioned relative to the master vessel. The controller may be located on the master vessel.

System 300 is alternately towed in a first direction (e.g., S→N) and a second direction (e.g., N→S), which is anti-parallel the first direction. Every time the heading is switched, system 300 is shifted cross-line (i.e., in E direction) with a distance d that is substantially equal to the cross-line distance between two adjacent seismic sources. In contrast, conventional system 50 was shifted only half this distance. Due to the larger shift, system 300 is able to complete surveying a target area in about half the time it takes conventional system 50 to survey the same target area. This increased productivity enables WAZ surveys to be finished in one season, decreasing the risk of an incomplete data set or having to return months later to finish the target area survey.

Figure 10:
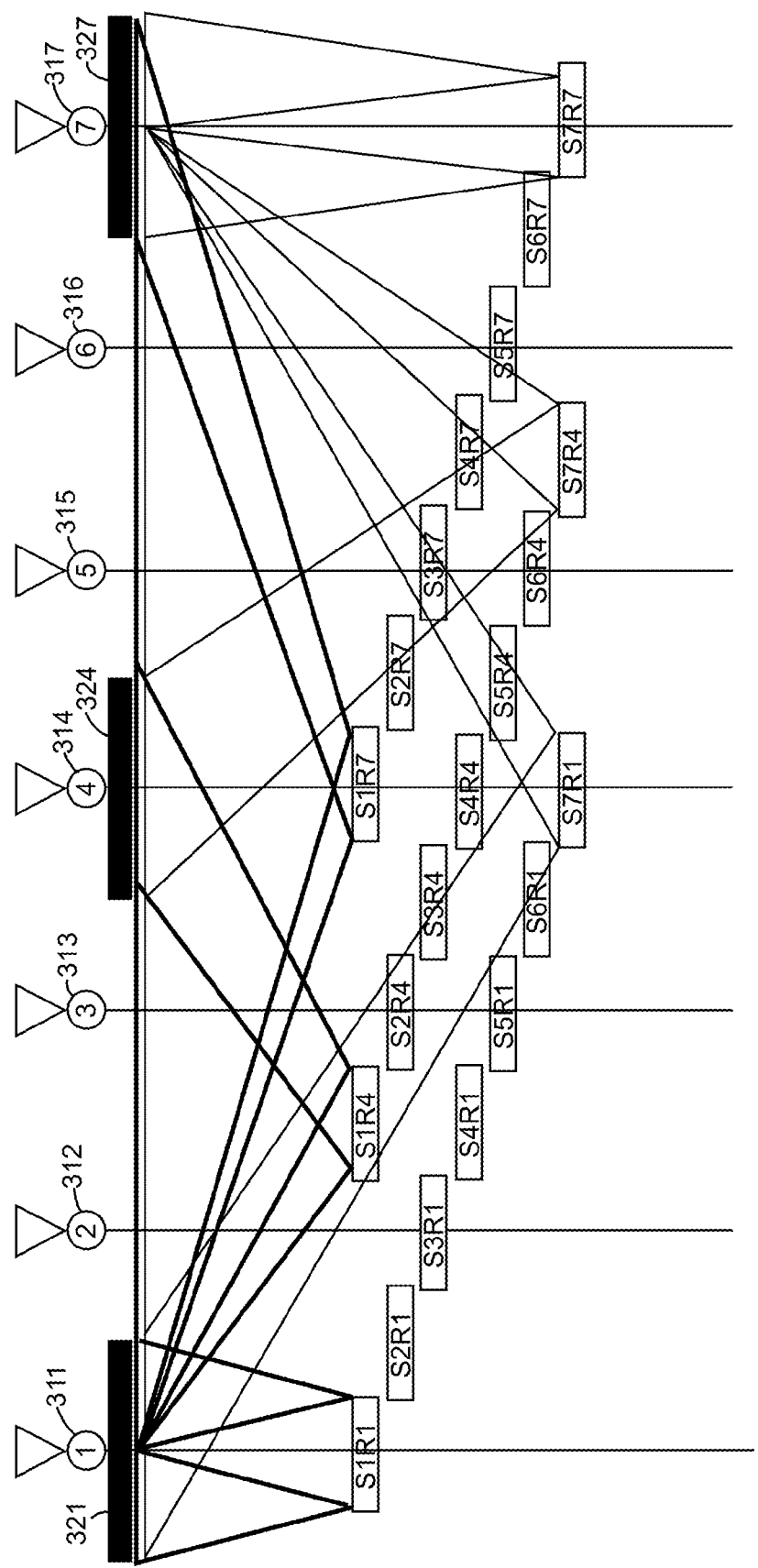
FIG. 10 is a diagram illustrating cross-line coverage of a super-shot position achieved with a WAZ data acquisition system according to an embodiment.

FIG. 10 is a cross-section in a vertical plane illustrating cross-line coverage for a super-shot position (i.e., the same type of information as described for the conventional WAZ data acquisition system based on FIGS. 3A-E). For the sake of clarity, only trajectories corresponding to seismic waves emitted from seismic sources 311 and 317 are drawn with continuous and dashed lines, respectively. For the other sources, 312-316, only the corresponding reflecting areas are represented, and they are labeled to indicate the seismic source (S1 corresponding to 311, S2 to 312, etc.) that emitted seismic waves and the streamer set receiving reflected seismic waves (R1 corresponding to 321, R4 to 324 and R7 to 327).

Figure 11:
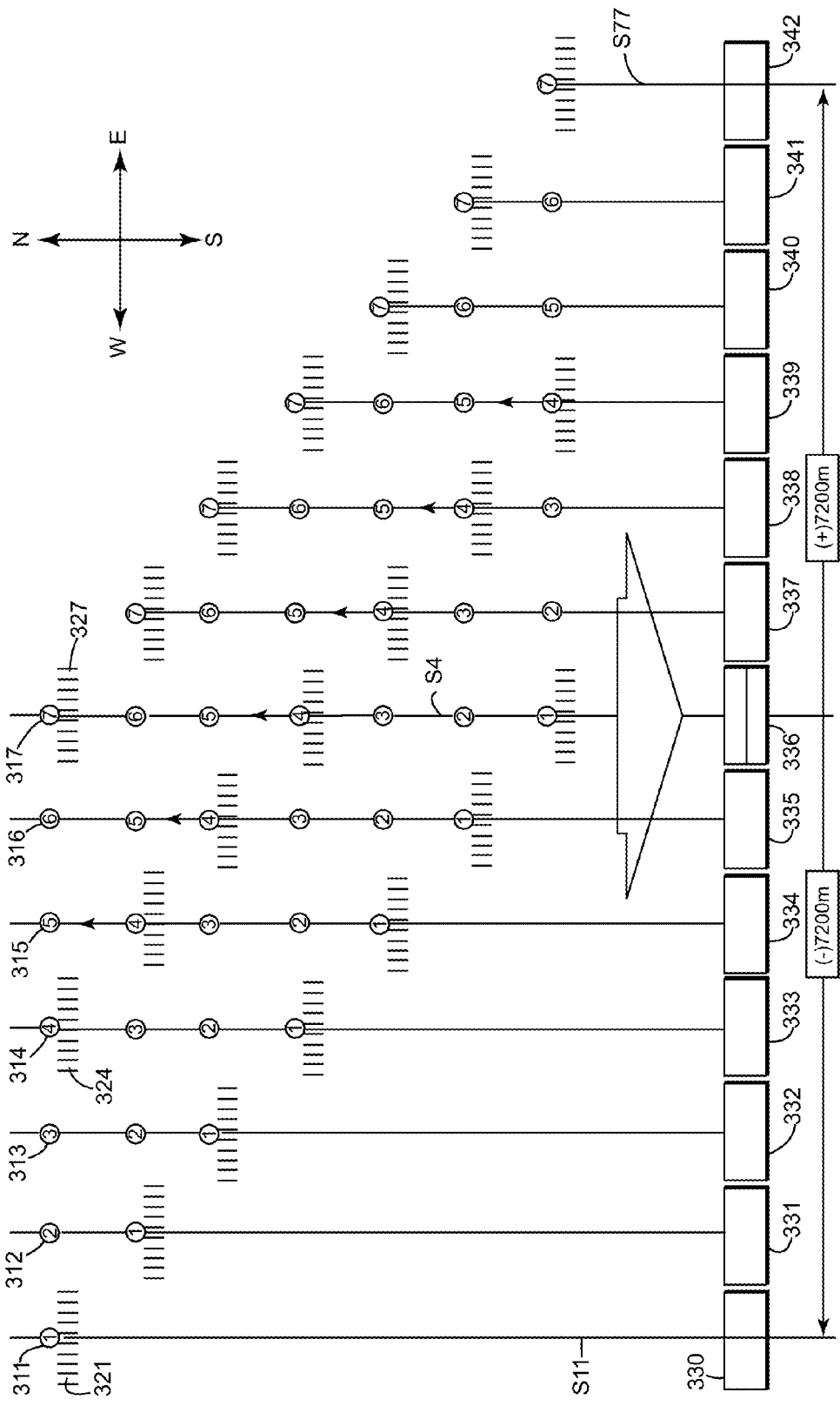
FIG. 11 is a diagram illustrating surface coverage achieved with a WAZ data acquisition system according to an embodiment.

FIG. 11 illustrates surface coverage resulting from seven successive passes. In FIG. 11, seismic sources 311-317 and streamer sets 321, 324, and 327 are only labeled in the first row. During a first pass (illustrated in FIG. 11's upper row) and considering source 315, streamer set 321 is towed to cover surface area 330 and acquires widest azimuth data westward relative to middle line $S_3$, while streamer set 324 is towed to cover surface area 333, and streamer set 327 is towed to cover surface area 336. Then, during a second pass (illustrated in FIG. 11's second row), the leftmost streamer set is towed to cover surface area 331, streamer set 324 is towed to cover surface area 334, and rightmost streamer set is towed to cover surface area 337.

Then, during a third pass, streamer sets are towed to cover surface areas 332, 335 and 338, etc. Thus, during the seven passes illustrated in FIG. 11, the streamer sets collect data while sweeping a surface area extending from −7,740 m ($S_{11}$ at −7200 m being the sail line of streamer set 321 during the first pass, plus the additional half-streamer spread extending at left of $S_{11}$ for 1,080/2 m) and +7,740 m ($S_{77}$ at 7,200 m being the sail line of streamer set 327 during the seventh pass, plus the additional half-streamer spread extending at right of $S_{77}$ for 1,080/2 m) relative to middle line $S_4$.

Figure 12:
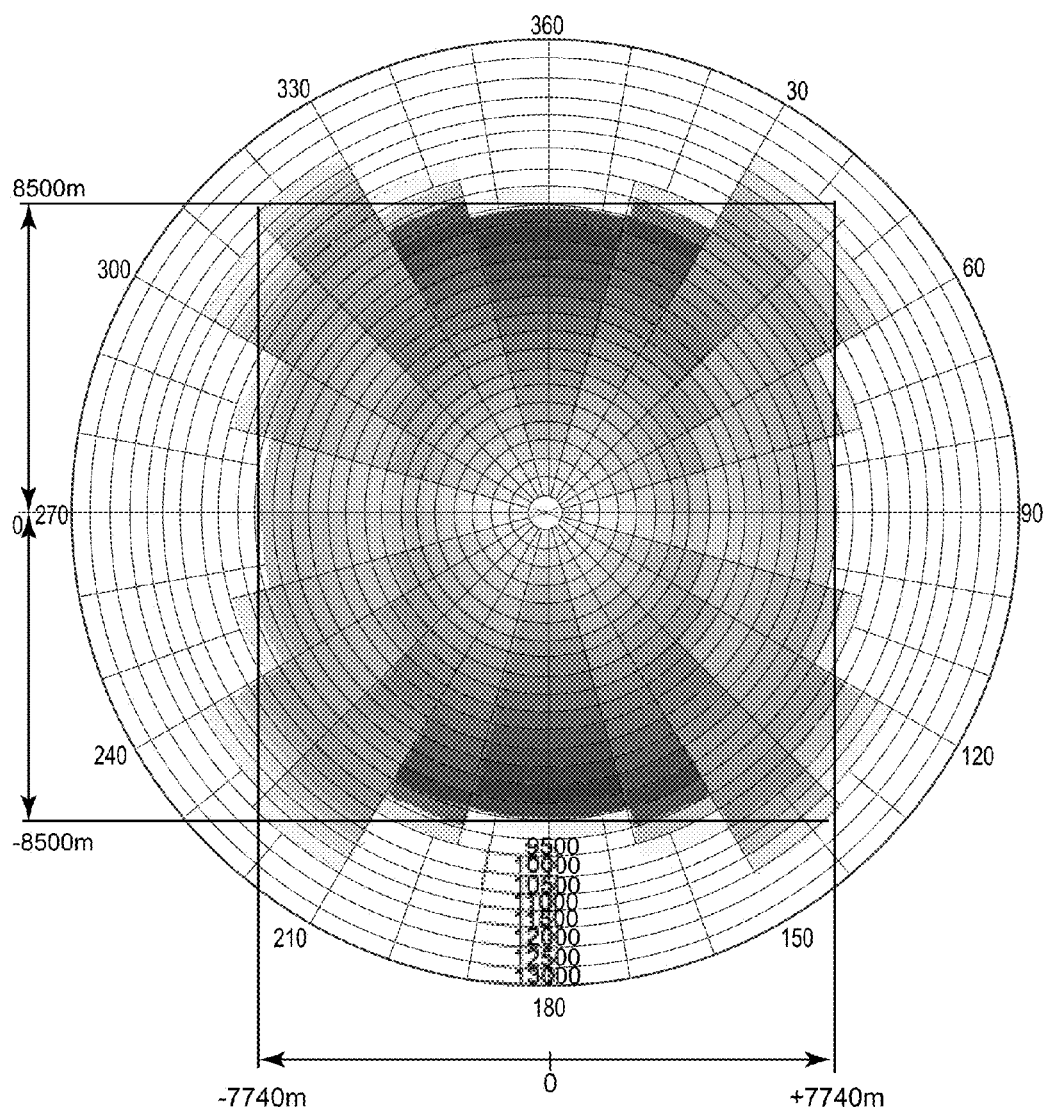
FIG. 12 is a graph illustrating angular distribution of data acquired using a WAZ data acquisition system according to an embodiment.

FIG. 12 illustrates angular coverage achieved with WAZ data acquisition system 300. Data acquisition reference length is equal to a sum of the streamer's length (e.g., about 8,100 m) and a distance between seismic sources 311, 314 and 317 and heads of streamer sets 321, 324 and 327 9 (e.g., about 400 m). Since data is acquired when the seismic data acquisition system is towed in both the first and second directions, graph in FIG. 12 shows bins covering a length from −8,500 m to 8,500 m. The circles around a central point O correspond to distances in increments of 500 m. Angular bins spanning 15° radial around point O have a shade of gray correlated with the number of traces. The darker the bin, the more traces corresponding to that bin have been detected.

Figure 13:
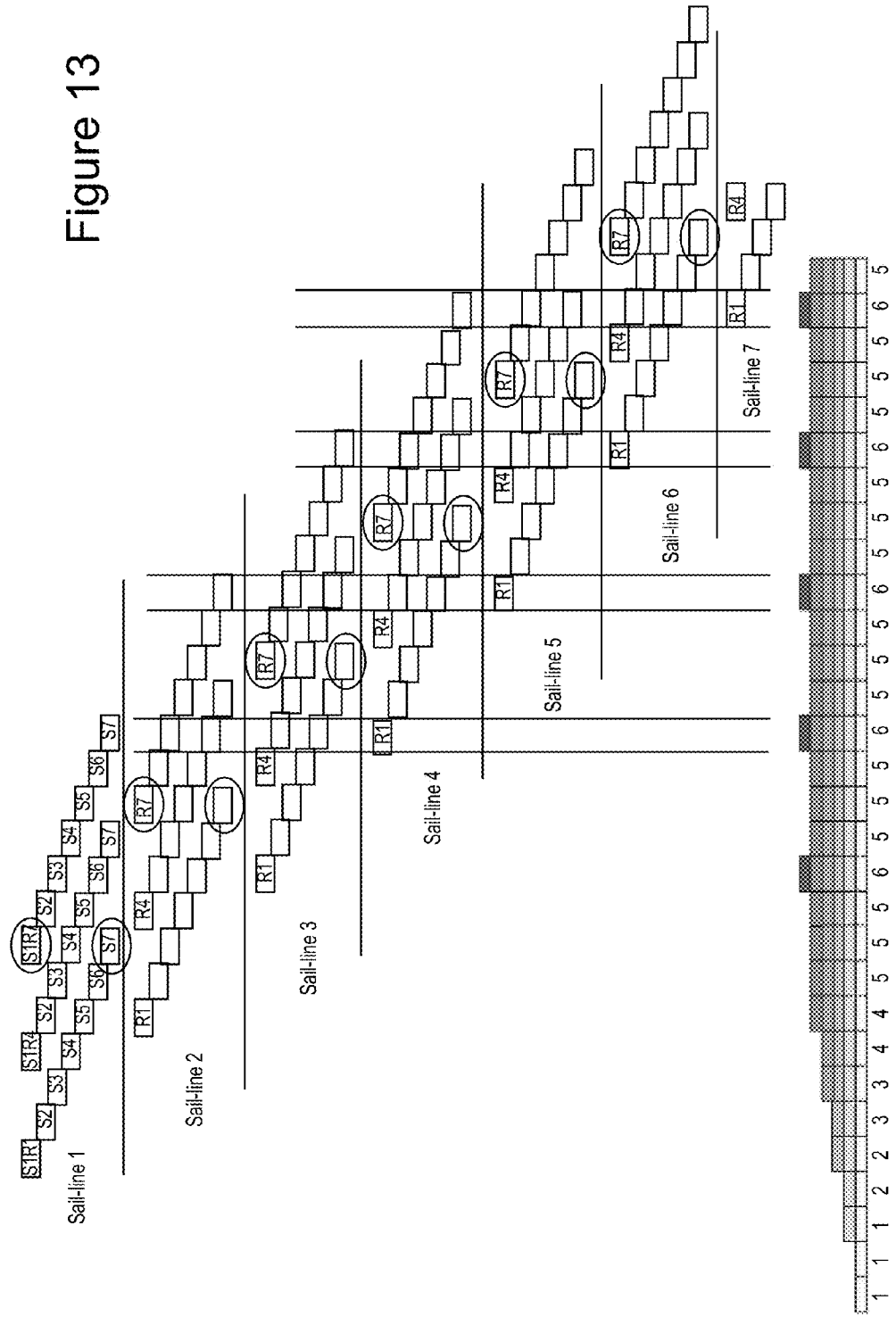
FIG. 13 illustrates inline coverage achieved using a WAZ data acquisition system according to an embodiment.

Analyzing inline coverage to determine cross-line fold, FIG. 13 shows tiles acquired during a sequence of seven inline passes of system 300. The first band of FIG. 13, Sail-line 1, shows tiles acquired during a first pass. The leftmost tile in the first row of this band, S1R1, corresponds to data related to seismic reflections detected by streamer set 321 (R1), after seismic source 311 (S1) has been activated. Next, seven tiles (that are labeled only to indicate the seismic source) descending from tile S1R1 also correspond to data related to seismic reflections detected by streamer set 321 but the wave reflections are detected after seismic sources 312 (S2), 313(S3), 314(S4), 315(S5), 316(S6) and 317(S7) have respectively been activated at successive shot-positions.

Also in the first band of FIG. 13, Sail-line 1, tile S1R4 corresponds to data related to seismic reflections detected by streamer set 324 (R4) after seismic source 311 has been activated. Next, seven tiles (that are labeled only to indicate the seismic source) descending from tile S1R4 also correspond to data related to seismic reflections detected by streamer set 324, but the wave reflections are detected after seismic sources 312-317 have respectively been activated. The next group of tiles in the first band of FIG. 13 has on top tile S1R7 which corresponds to data related to seismic reflections detected by streamer set 327 (R7).

The second band in FIG. 13, Sail-line 2, shows tiles acquired during a second pass, and so on. In the second to seventh band, only detectors are indicated (i.e., R1, R4, R7) on each group of seven tiles corresponding to the seven seismic sources, S1-S7, being fired. At the bottom of FIG. 13, a histogram represents the tiles acquired during these seven passes. After a roll-in portion (on the left) of building up coverage, five or six tiles are acquired for each position. Thus, cross-line fold is 5 or 6 for system 300.

The inline fold for system 300 can be calculated assuming the same streamer length (8,100 m), channel separation (12.5 m), towing speed (4.5 knots=4.5×0.514 m/s=2.313 m/s) as used for conventional system 50, although these quantities are merely exemplary and not intended to be limiting. If the seismic sources are towed at predetermined inline intervals so as to be activated one by one at the same inline level, a shot cycle for system 300 includes seven shots for the seven sources, and a distance between consecutive super-shot positions is $$\text{SuperShotSeparation}=7\times2.313\text{ ms}^{-1}\times13.5\text{ s}=218.58\text{ m}.$$

Using equation (1), InlineFold=18.52, and Total fold=18.52×(5 or 6)=92.5 or 111 for WAZ data acquisition system 300, when the seismic sources are activated one by one. The total fold is smaller than the total fold for conventional WAZ data acquisition system 50 because of the longer distance between consecutive super-shot positions and the smaller cross-line fold. The higher the total fold, the better the noise can be filtered out.

Figure 14:
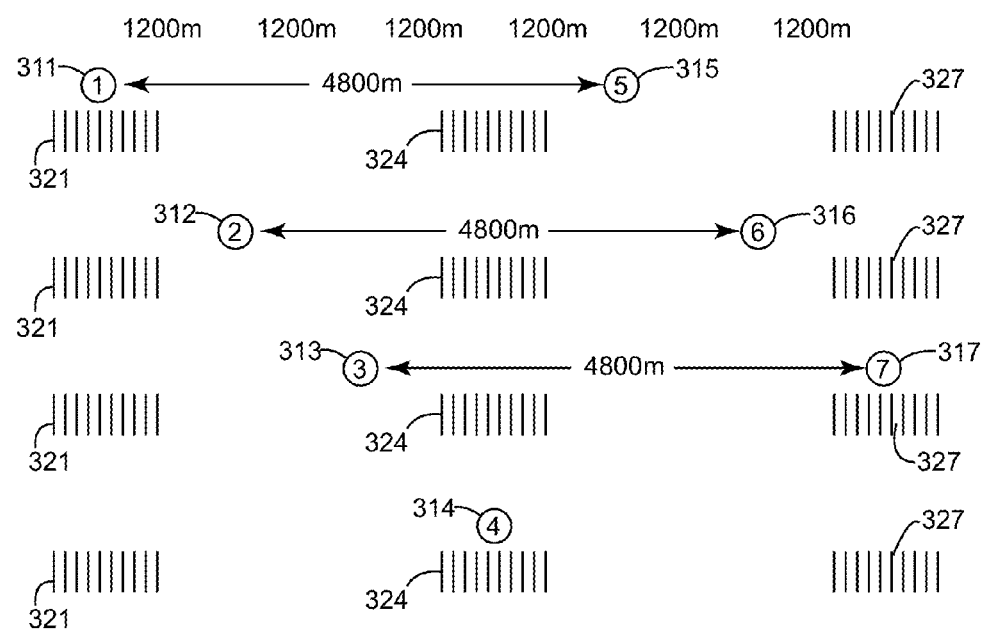
FIG. 14 illustrates a high-density seismic source activation sequence according to an embodiment.

The total fold may be further increased relative to the conventional WAZ, by activating pairs of seismic sources to have overlapping listening time intervals. For example, FIG. 14 illustrates a high-density seismic source activation sequence (time flowing from upper band to lower band therein). According to this activation sequence, seismic sources 311 and 315 are activated to have first overlapping listening time intervals, then seismic sources 312 and 316 are activated to have second overlapping listening time intervals, and so on as illustrated. In order to arrive at the same super-shot inline position, seismic sources 311 and 315, 312 and 316, 313 and 317 are towed at the same inline offset level.

Some other optional features of the high-density seismic source activation sequence may be observed based on FIG. 14. Each of the pairs of seismic sources operating at the same time includes at least one seismic source behind which no streamer set is towed. Seismic source 314 is towed between the seismic sources of any of the pairs of seismic sources. Another optional feature illustrated in FIG. 14 is that cross-line separation (e.g., 4,800 m) is the same for the seismic sources in any pair. However, these optional features have no significant impact on WAZ data quality.

When using this activation sequence, a distance between consecutive super-shot positions becomes $$\text{SuperShotSeparation}=4\times2.313\text{ ms}^{-1}\times13.5\text{ s}=125\text{ m}.$$

Therefore, InlineFold=32.4, and then Total fold=32.4×(5 or 6)=162 or 194.4 for system 300 when this activation sequence is used.

Figure 15:
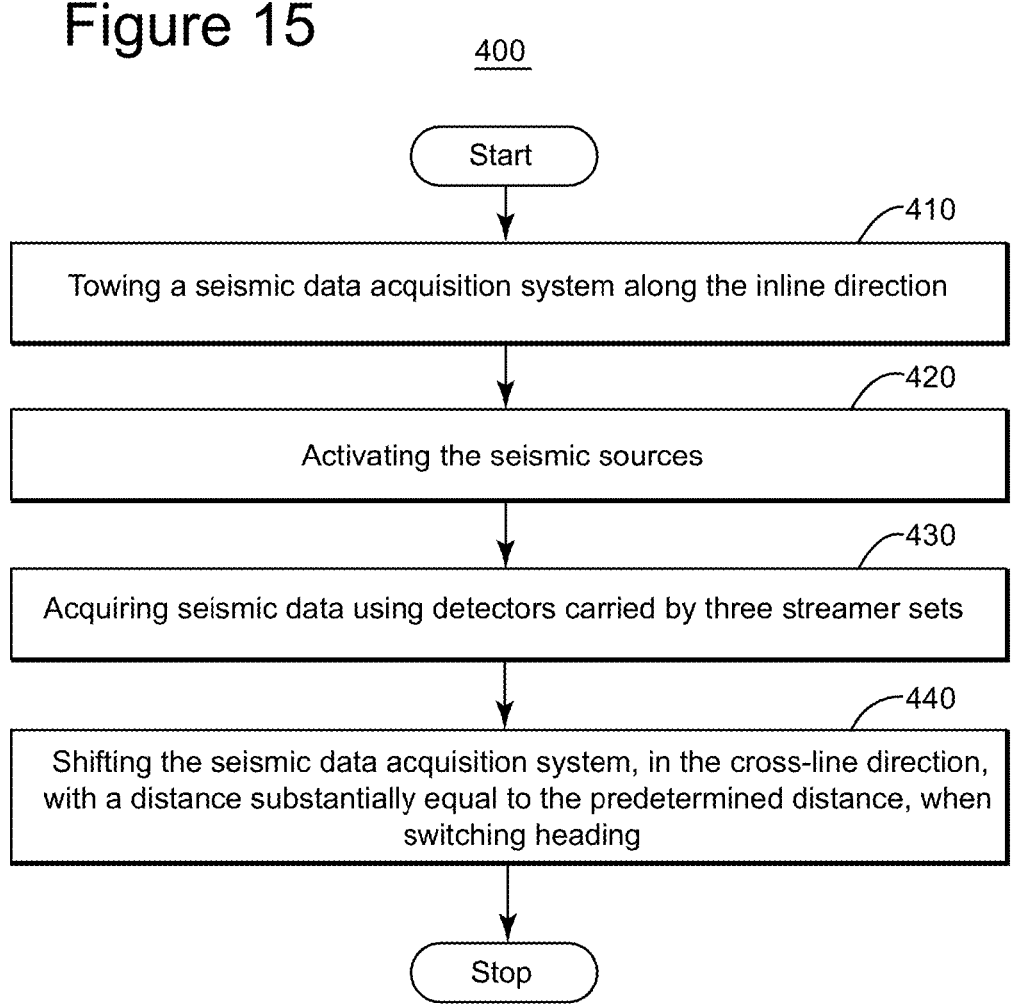
FIG. 15 is a flow diagram of a method for seismic data acquisition according to an embodiment.

In view of the above description, FIG. 15 is a flow diagram of a method 400 for seismic data acquisition according to an embodiment. Method 400 includes towing a seismic data acquisition system (e.g., 300) along the inline direction (N→S or S→N), at 410. Method 400 further includes activating the seismic sources (e.g., 311-317), at 420, and then acquiring seismic data using detectors carried by three streamer sets (e.g., 321, 324 and 327) at 430. Method 400 further includes shifting the seismic data acquisition system, in the cross-line direction, with a distance substantially equal to the predetermined distance, when switching between heading parallel to the inline direction (e.g., S→N) and heading anti-parallel to the inline direction (e.g., N→S) at 440.

Figure 16:
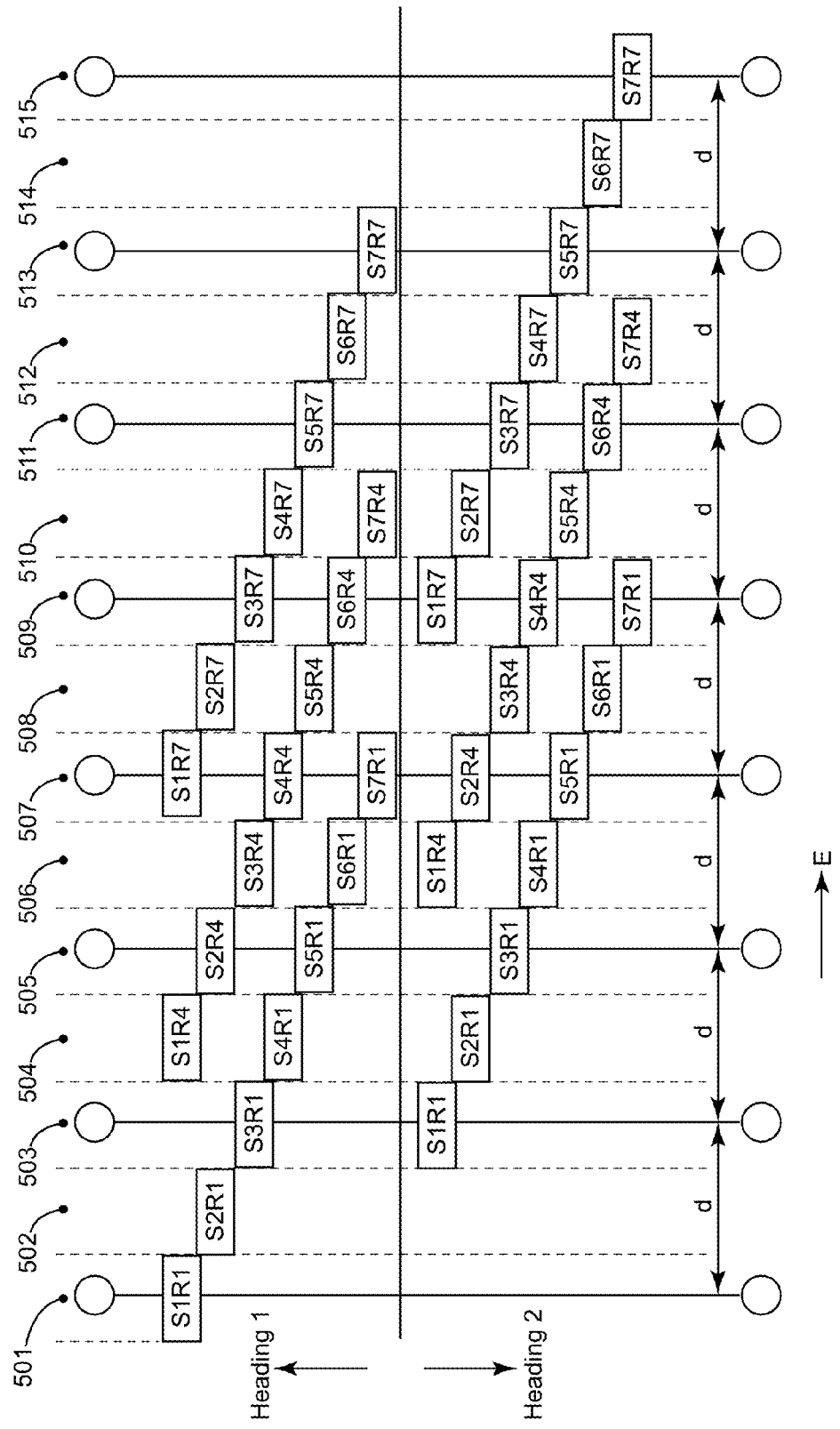
FIG. 16 illustrates tiles of data acquired at a super-shot position when the WAZ data acquisition system in FIG. 9 has a cross-line step substantially equal to the distance between adjacent seismic sources.

It has been observed that WAZ data acquired with the system 300 that is shifted cross-line (when heading is changed) with the predetermined distance between the seismic sources may be deficient in terms of consistency of minimum offset data. To explain this matter, the upper half of FIG. 16 illustrates tiles of data acquired at a super-shot position when the data acquisition system is towed in a first direction (i.e., S→N, the circles symbolize the seismic sources), and the lower half of FIG. 16 illustrates tiles of data acquired at a super-shot position when the data acquisition system is towed in a second direction (i.e., N→S), opposite the first direction. The bottom area is split in d/2 bands 501-515. No narrow azimuth data and no minimum offset data (e.g., S2R1) are acquired for the areas 502, 504, 506, etc. Narrow azimuth data and minimum offset data are acquired for 501, 507, 513 when the data acquisition system is towed in the first direction (S→N) and 503, 509, 515 when the data acquisition system is towed in the second direction (i.e., N→S).

Figure 17:
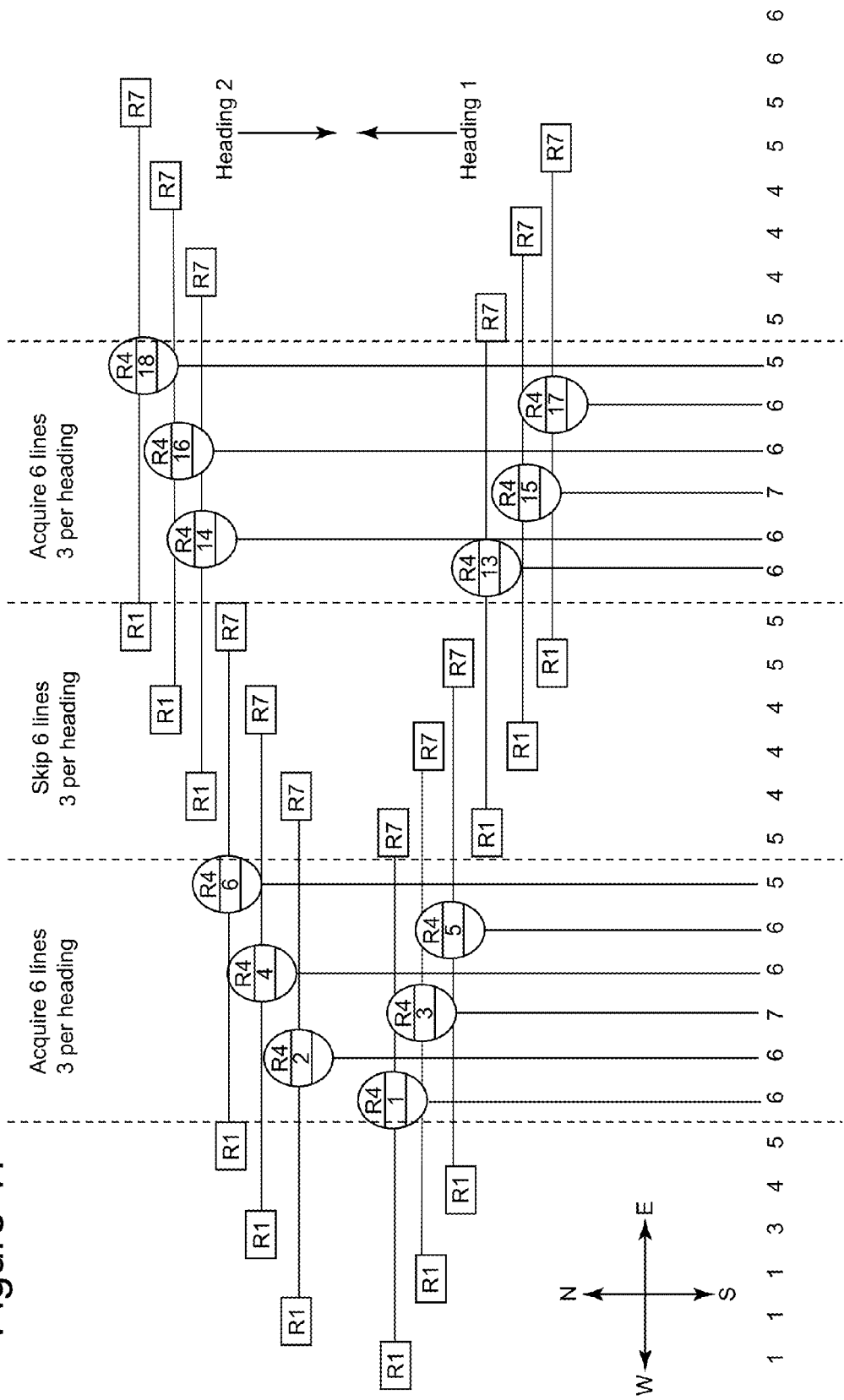
FIG. 17 is a schematic representation of a method using the WAZ data acquisition system in FIG. 9, according to another embodiment.

In order to improve consistency of minimum offset and yet maintain productivity and the additional wide azimuth data advantage, in one embodiment, at a heading switch, the seismic data acquisition system is shifted, in the cross-line direction, with half the cross-line distance between adjacent seismic sources, and, after six sail lines (three times in the first direction and three times in the second direction), the seismic data acquisition system is shifted cross-line with three times the cross-line distance. This method is illustrated in FIG. 17, in which the data acquisition system is illustrated by three rectangles labeled R1, R4 and R7 (symbolizing the respective streamer sets) connected by a horizontal line. The middle rectangles, labeled R4, are surrounded by small ovals. If successive cross-line positions at 600 m (half cross-line distance) were labeled 1, 2, 3, . . . 18, the numbers inside the ovals are 1, 2, 3, 4, 5, 6, and then 13, 14, 15, 16, 17, 18 to illustrate sail lines along which the middle streamer set is towed according to this method. The WAZ data acquisition system skips sail lines in positions 7-12 (so these numbers are not present in FIG. 17). The numbers at the bottom of FIG. 17 correspond to the cross-line fold resulting from this method of data acquisition. Once the cross-line roll-on is built up, the cross-line fold is between 4 and 7.

Figure 18:
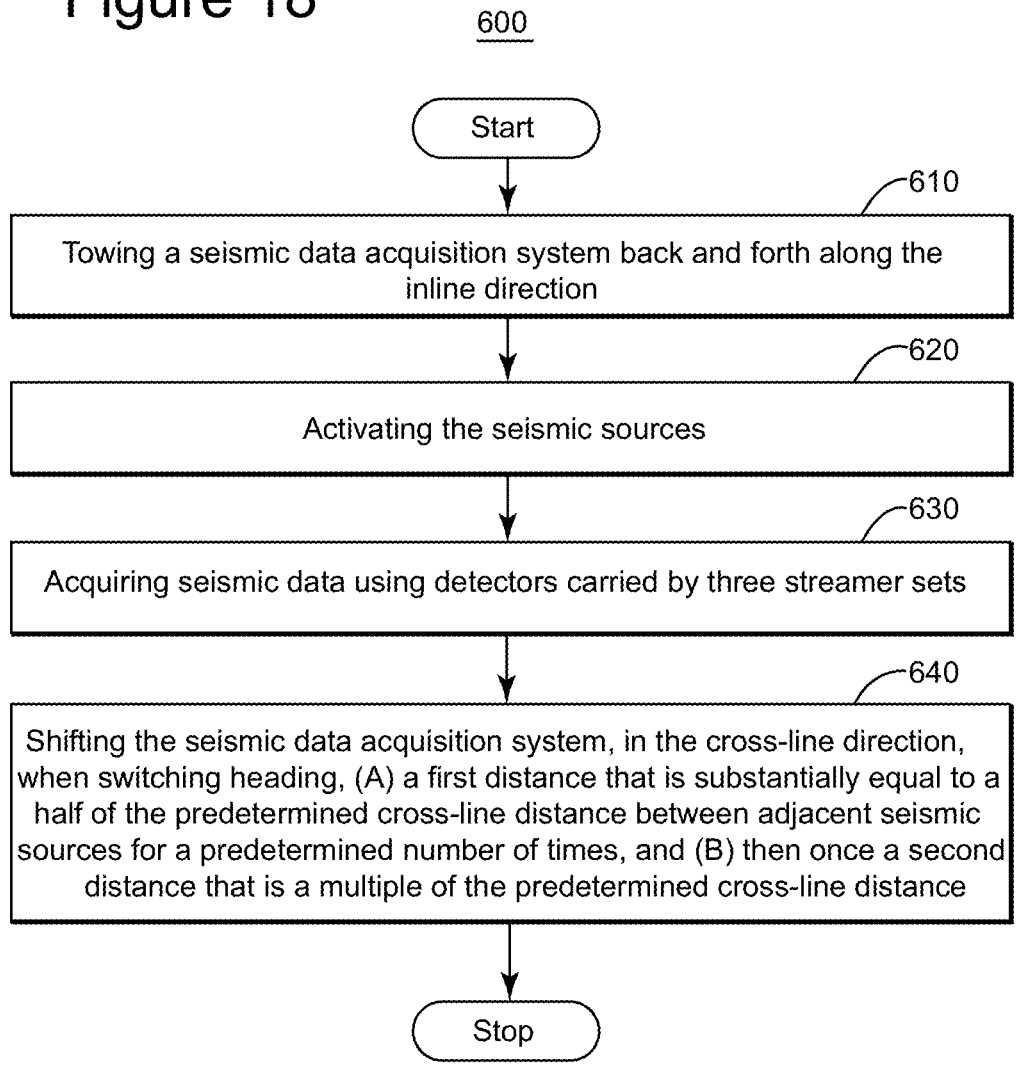
FIG. 18 is a flowchart of a method for seismic data acquisition, according to another embodiment.

A flowchart of this method is illustrated in FIG. 18. Method 600 includes towing a seismic data acquisition system (e.g., 300) back and forth along an inline direction (i.e., N→S or S→N), at 610. Method 600 further includes activating the seismic sources (e.g., 311-317), at 620, and then acquiring seismic data using detectors carried by three streamer sets (e.g., 321, 324 and 327), at 630.

Method 600 further includes shifting the seismic data acquisition system, in the cross-line direction, when switching between heading parallel to the inline direction and heading anti-parallel to the inline direction, at 640. The seismic data acquisition system is shifted a first distance that is substantially equal to half of the predetermined cross-line distance between adjacent seismic sources for a predetermined number of times (e.g., six times), and then the seismic data acquisition system is shifted once a second distance that is a multiple of the predetermined cross-line distance (e.g., three times the cross-line distance between the seismic sources).

Figure 19:
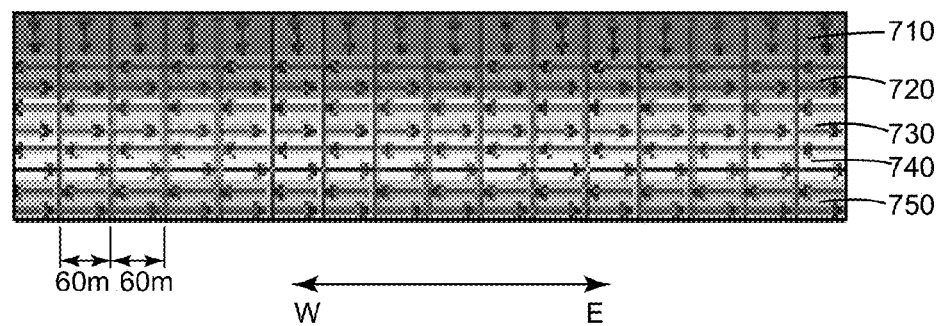
FIG. 19 illustrates offset coverage achieved with the conventional WAZ data acquisition system of FIG. 2.
Figure 20:
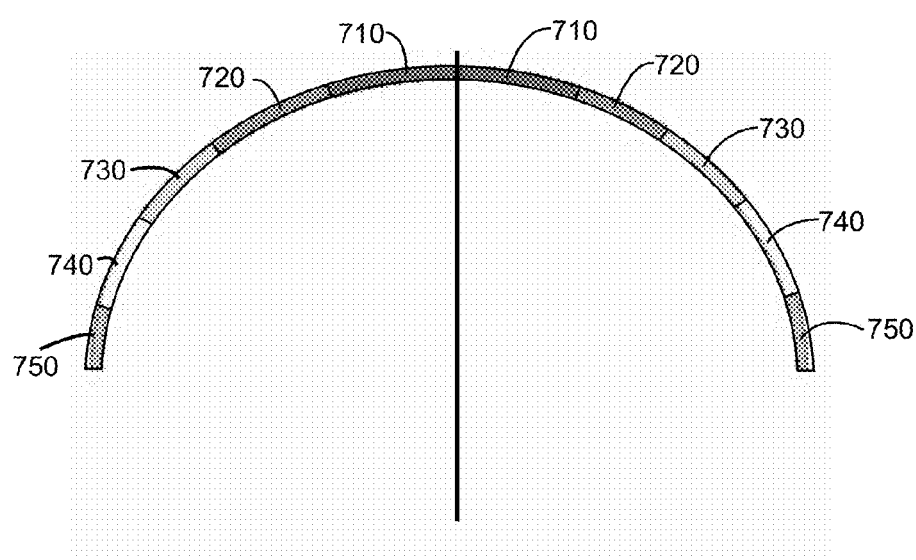
FIG. 20 represents the angular coverage corresponding to FIG. 19.

Although, this embodiment achieves consistency for minimum offsets, there is less wide azimuth data consistency. To explain this matter, FIG. 19 illustrates offset coverage achieved with conventional system 50. FIG. 19 illustrates 600 m-wide seafloor bands adjacent to one another on cross-line direction (W→E). For each band, streamer sets 71 and/or 75 acquire data 710, 720, 730, 740 and 750 corresponding to 0 m, ±1,200 m, ±2,400 m, ±3,600 m and ±4,800 m, respectively between the activated source and the middle of the streamer set acquiring the data (where "+" means towards E and therefore it is represented by "→" symbol and "−" means towards W and it is represented by "←" symbol, symbol "↓" representing a 0 m distance). FIG. 20 represents the angular coverage corresponding to FIG. 19.

Figure 21:
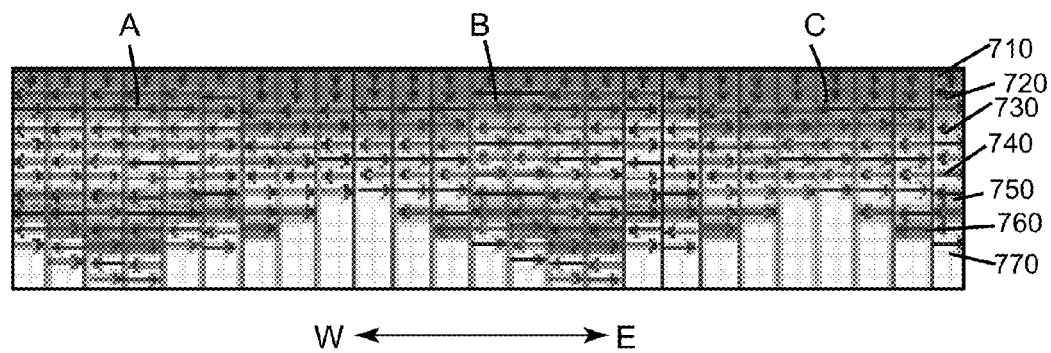
FIG. 21 illustrates the offset coverage achieved using the WAZ data acquisition system illustrated in FIG. 9 and operated in the manner illustrated in FIG. 17.

FIG. 21 illustrates offset coverage achieved using WAZ data acquisition system 300 operated in the manner illustrated in FIG. 17. In this case, for explored d/2 wide seafloor bands on cross-line direction (W→E), streamer sets 321, 324 and 327 acquire data 710-770 corresponding to 0, ±d, ±2d, ±3d, ±4d, ±5d and ±6d (where d may be 1,200 m or may take another value) between the activated source and the middle of the streamer set acquiring the data (significance of symbols "→", "←" and "↓" is the same as previously explained for FIG. 19).

Figure 22:
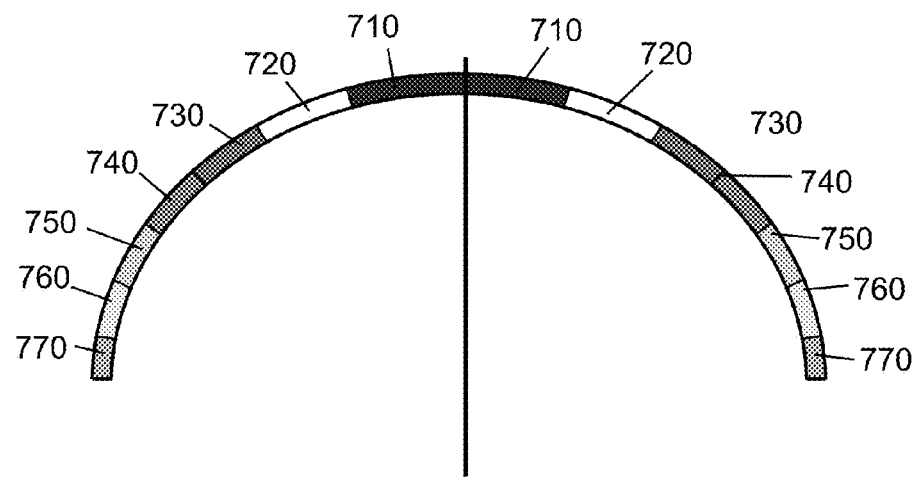
FIGS. 22, 23 and 24 represent angular coverage for different bins in FIG. 21.
Figure 23:
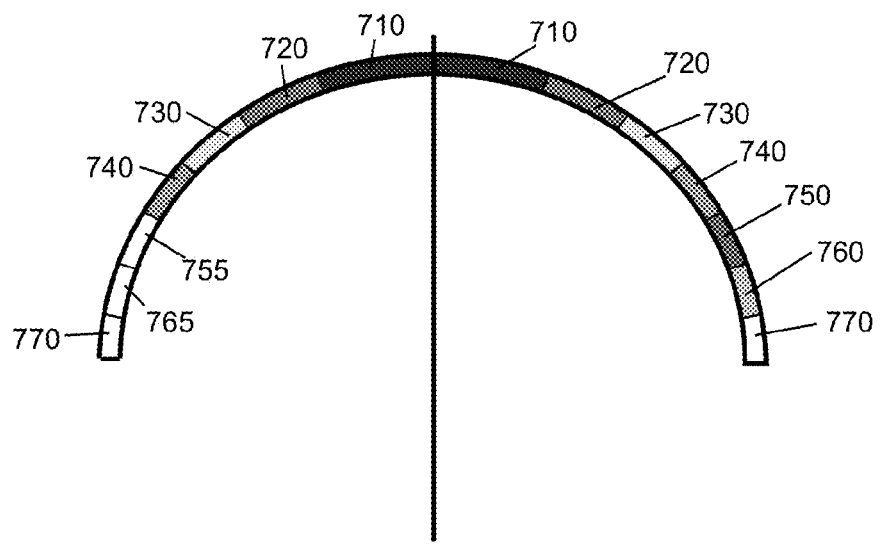
Figure 24:
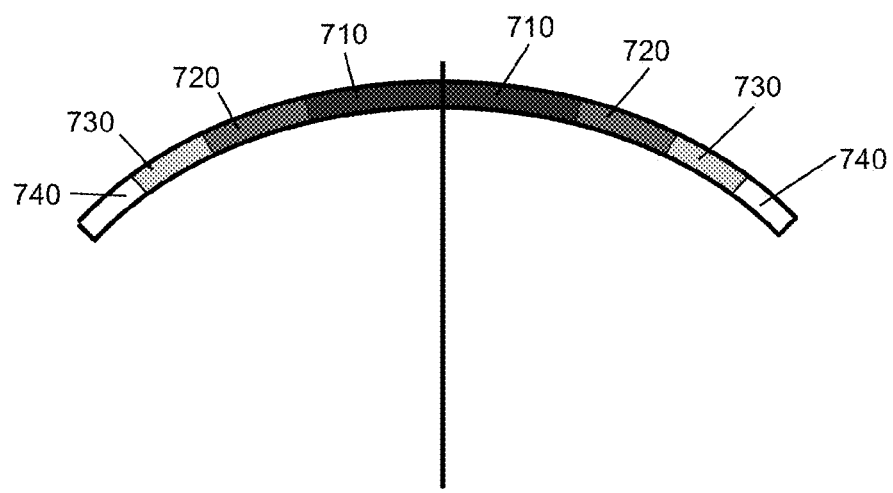

For all the bands, the smaller offset data corresponding to 0, ±d, ±2d, ±3d (i.e., 710-740) is consistently acquired. However, taking into consideration the wider azimuth data, three types of coverage in the data may be identified as types A, B and C. FIG. 22 illustrates type A which shows complete coverage for all offsets, i.e., 710-770. FIG. 23 illustrates type B which is an asymmetric incomplete coverage because offset data 750 and 760 is missing in zones 755 and 765. FIG. 24 illustrates minimal consistent coverage up to ±3d, similar to the coverage consistently achieved by conventional WAZ system 50.

For WAZ data acquisition system 300 operated in the manner illustrated in FIG. 17, total fold has different values depending on whether the cross-line fold is 4, 5, 6 or 7. Since as previously calculated InlineFold=18.52 (for streamer length of 8,100 m and SuperShotSeparation=218.58 m), Total fold=18.52×(4, 5, 6 or 7)=(74.0, 92.5, 111, 129.64).

Another technique to increase fold is to activate a seismic source before listening time for data related to a previously activated source has ended, thus acquiring blended seismic data in which a signal due to one source overlaps another signal due to another source. Depending on tow speed, the inline step and distance between super-shot positions may be made smaller. Table in FIG. 25 shows correlation between tow speed (between 4 and 5 knots), the inline step (31.25 m, 25 m, and 18.75 m), and the portion of data listening time without overlap with listening time related to another source, called SP duration.

If the inline step is 25 m, then SuperShotSeparation is 175 m, and InlineFold is 23.14, yielding to Total fold=23.14×(4, 5, 6 or 7)=(92.56, 115.70, 138.84, 162).

If the inline step is 18.75 m, then SuperShotSeparation is 131.25 m, and InlineFold=30.86, yielding to Total fold=30.86×(4, 5, 6 or 7)=(123.44, 154.3, 185.16, 216). (GargantuSEIS)

Figure 26:
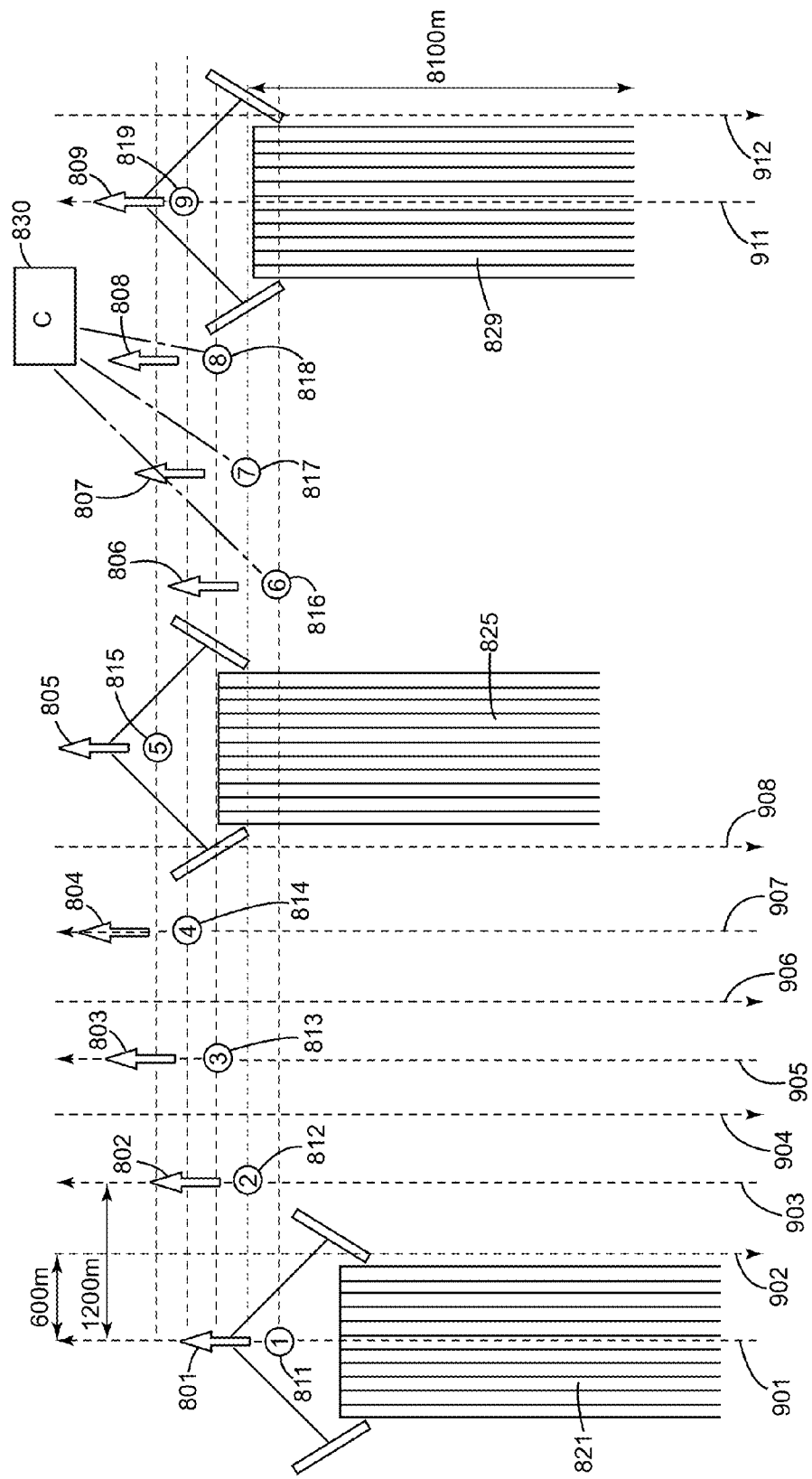
FIG. 26 is a diagram of a WAZ data acquisition system according to another embodiment.

Another embodiment is now discussed with regard to FIG. 26, which is a bird's-eye view of a WAZ data acquisition system 800. System 800 includes nine vessels 801-809 towed inline at substantially equal predetermined cross-line distances d (e.g., 1,200 m) from one another. Each vessel tows a corresponding seismic source 811-819, respectively. Vessels 801, 805 and 809 also tow streamer sets 821, 825 and 829 behind seismic sources 811, 815 and 819, respectively. Streamer sets 821, 825 and 829 may have substantially the same geometry (e.g., each of the streamer sets may include ten individual streamers each about 8,100 m long, and cross-line separation between streamers of about 120 m). System 800 may also include a controller 830 configured to activate the seismic sources at predetermined super-shot positions in the inline direction. In one embodiment, one streamer vessel (e.g., 801 or 809) is master vessel, the other vessels being positioned relative to the master vessel. The controller may be located on the master vessel.

Seismic sources 811 and 816 are towed at the same first inline level. Similarly, seismic sources 812 and 817 are towed at the same second inline level, seismic sources 813 and 818 at the same third inline level, and seismic sources 814 and 819 at the same fourth inline level. Thus, seismic sources 811 and 816 reach super-shot positions at substantially the same time and are activated to have overlapping first listening time intervals. Similar descriptions are valid for the other seismic sources illustrated in FIG. 26. In one embodiment, a pair of sources, (e.g., 812 and 817) may be activated before listening time intervals for the previous pair of sources (e.g., 811, and 816) ended.

Figure 27:
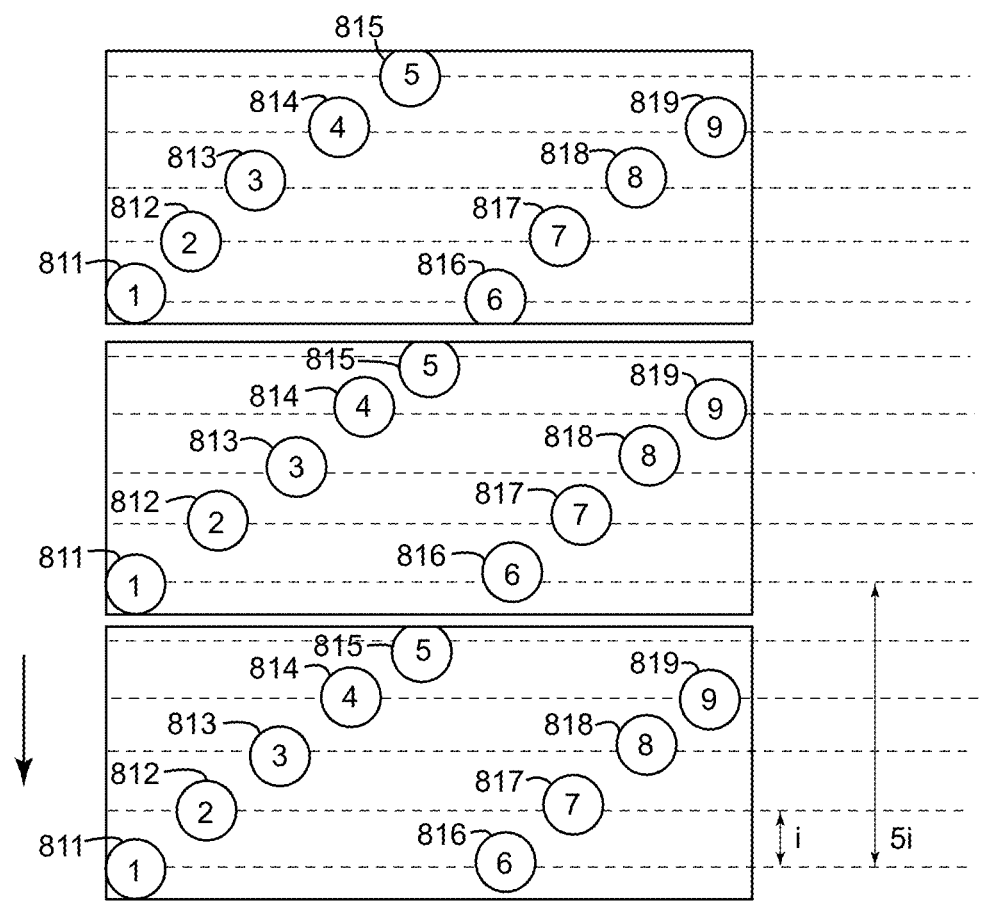
FIG. 27 illustrates a high-density seismic source activation sequence according to an embodiment.

FIG. 27 illustrates a high-density seismic source activation sequence for system 800. Each rectangle includes all sources activated at the same super-shot position: first sources 811 and 816, then 812 and 817, 813 and 818, 814 and 819, and finally 815. The line step is i (e.g., 25 m) and distance between successive super-shot positions is 5i (e.g., 125 m). The cross-line separation between seismic sources activated to have overlapping listening time intervals is five times the cross-line distance between adjacent sources (e.g., 6,000 m). However, this is an optional feature, not intended to be a limitation (i.e., it is not a requirement). Source 815, which is the middle source and is not part of any pair of sources, is located cross-line in between the sources in each pair. This is also an optional feature, not intended to be a limitation. However, these optional features have no significant impact on WAZ data quality.

Figure 28:
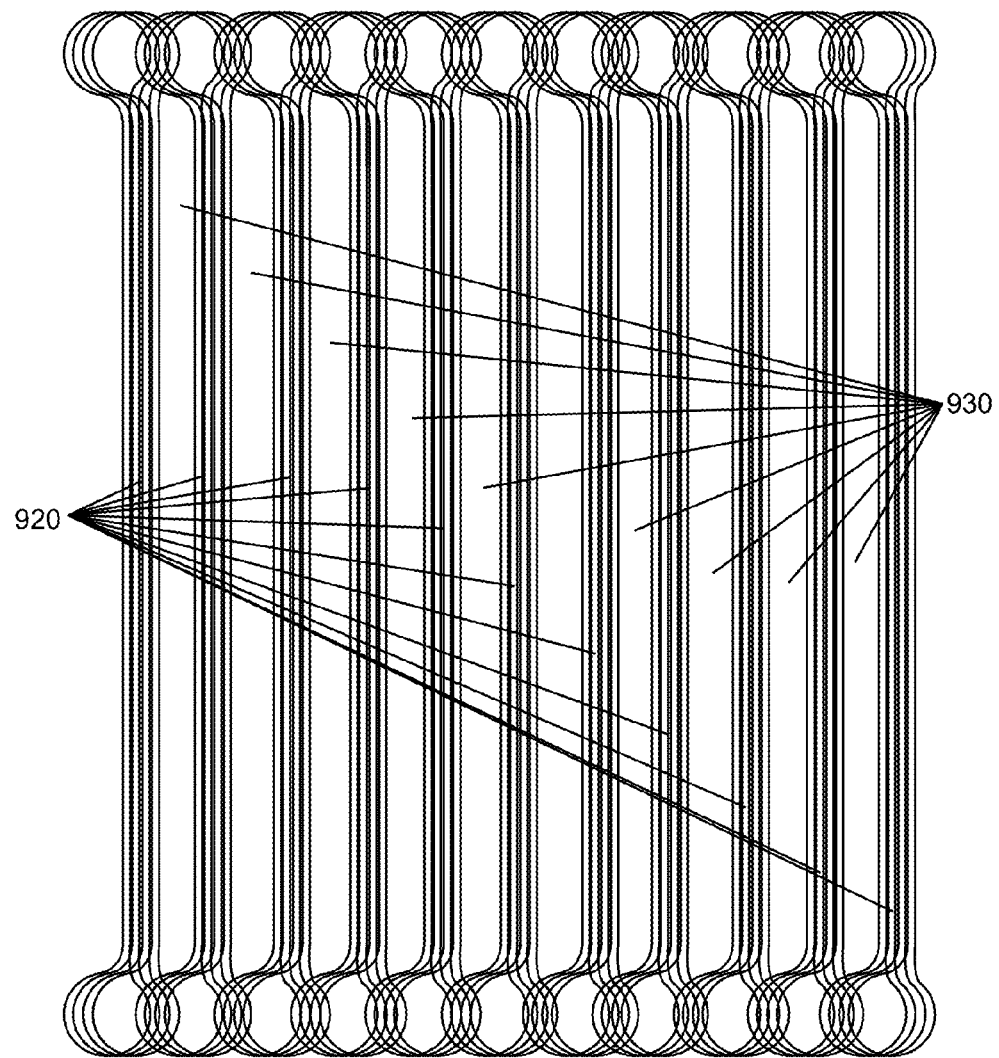
FIG. 28 is a bird's-eye view of a survey pattern according to an embodiment.

Returning to FIG. 26, system 800 is operated to cyclically sail eight lines 901-908, while being shifted cross-line at each heading switch with half the cross-line distance between adjacent seismic sources, and then to skip four times the cross-line distance (and then a next cycle begins with sailing other eight lines like 911, 912 . . . ). FIG. 28 is a bird's-eye view this survey pattern, according to which surveyed bands 920 are interleaved with skipped bands 930.

One notes that both system 300 operated as illustrated in FIG. 17 and system 800 operated as illustrated in FIG. 26 operated as illustrated in FIG. 28 scan a number of substantially equidistant sail-lines (six and eight, respectively) at a cross-line step before being shifted for a multiple of the cross-line step. This number is one less than the number of sources (seven and nine, respectively).

Figure 29:
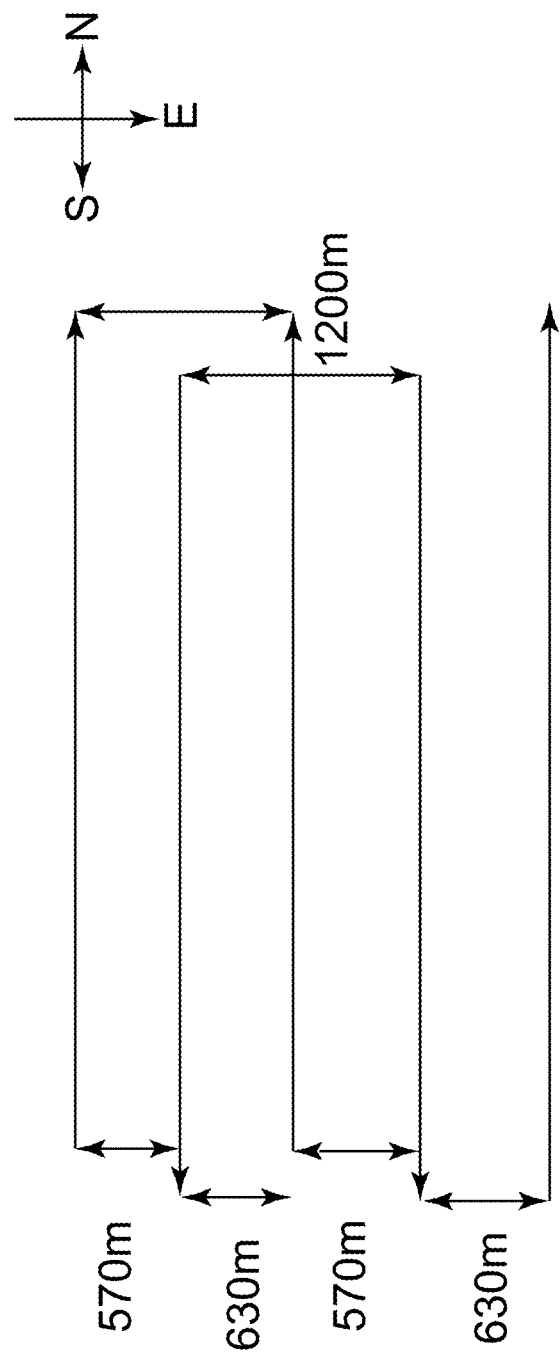
FIG. 29 illustrates shifting a WAZ data acquisition system with different distances when switching heading.

In one embodiment, the cross-line distances between the eight consecutive sail-lines are not equal. In other words, as illustrated in FIG. 29, at a heading switch from the first direction (e.g., S→N) to the anti-parallel second direction (e.g., N→S), the seismic data acquisition system is shifted cross-line with a first distance (e.g., 570 m), and at a heading switch from the second direction to the first direction, the seismic data acquisition system is shifted cross-line with a second distance in the cross-line direction (e.g., 630 m). The sum of the first distance and the second distance is substantially equal to the cross-line distance between the adjacent sources. The difference between the second distance and the first distance (e.g., 60 m) may be substantially equal to half the cross-line distance (e.g., 1,200 m) divided by the number of streamers in a streamer set (e.g., 10). The effect of this difference between the second distance and the first distance is to reduce bin-width, which has a significant impact in detecting and recording high-frequency seismic waves.

Figure 30:
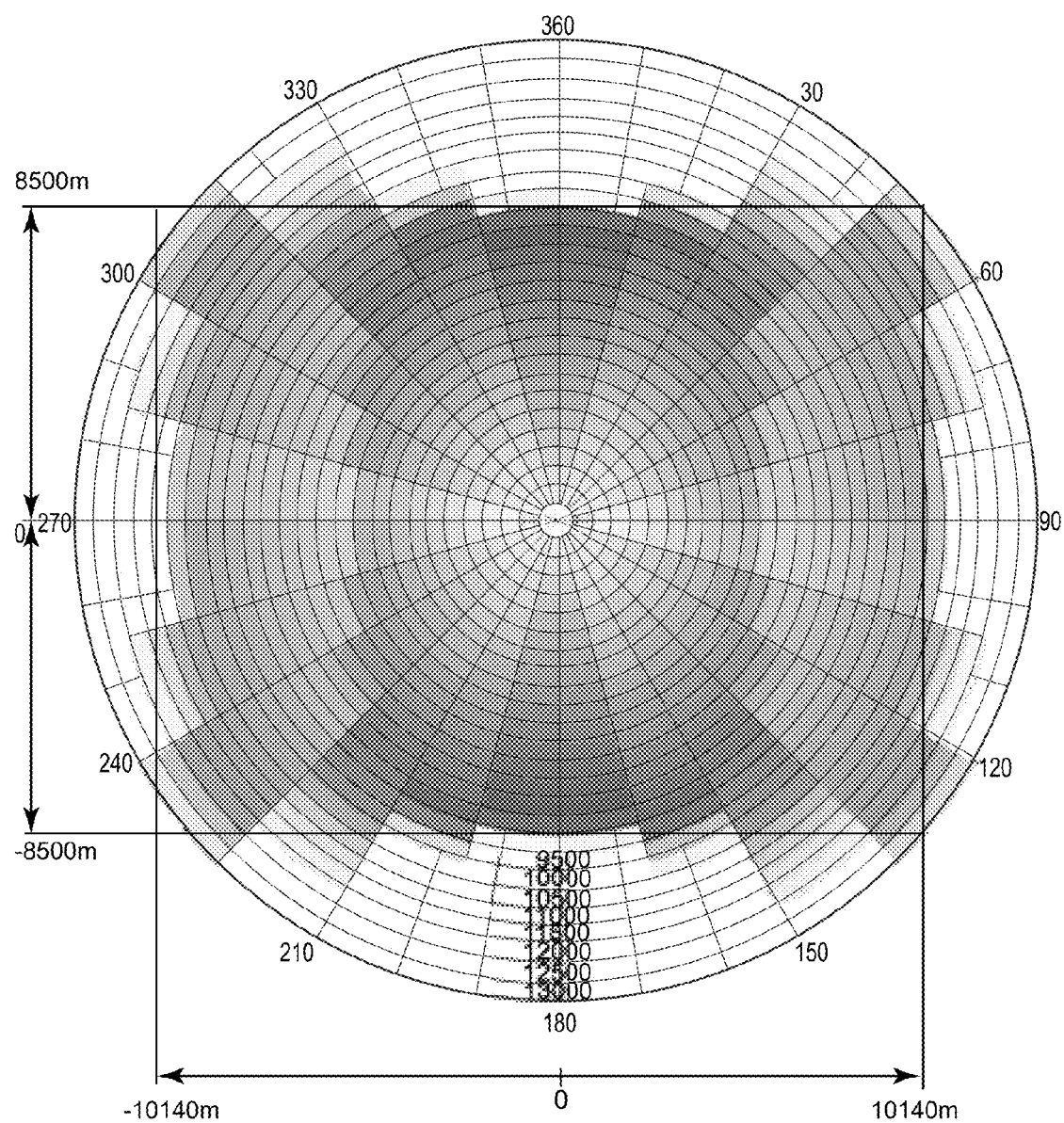
FIG. 30 illustrates angular coverage achieved with WAZ data acquisition system of FIG. 26.

FIG. 30 illustrates angular coverage achieved with WAZ data acquisition system 900. For enabling comparison with graphs in FIGS. 7 and 12, for this graph a distance between seismic sources 811, 815 and 819, and heads of streamer sets 821, 825 and 829 is also 400 m, yielding a data acquisition reference length of about 8,500 m (i.e., 400 m+8,100 m, which is a streamer's length). The cross-line separation between adjacent sources is considered also 1,200 m and streamer set spread is 1,080 m, so that the cross-line (EW) acquisition width is ±(8×1,200 m+1,080/2) m. The circles around a central point O in the graph correspond to distances in increments of 500 m. Angular bins spanning 15° radial around point O have shades of gray correlated with the number of traces in the bin. The darker the bin, the more traces corresponding to that bin have been detected.

Figure 31:
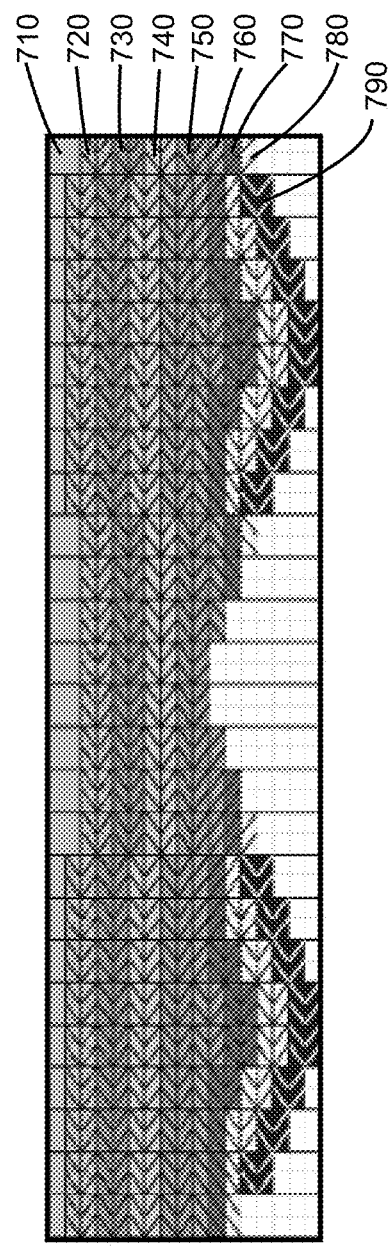
FIG. 31 illustrates the offset coverage achieved using WAZ data acquisition system.

FIG. 31 illustrates the offset coverage achieved using WAZ data acquisition system 800. In this case, the smaller offset data corresponding to 0, ±d, ±2d, ±3d, ±4d (i.e., 710-750) is consistently acquired, matching conventional coverage. Additional WAZ data (760-790) acquired in this embodiment may result in up to 17 different tiles with ultra-wide offsets up to ±10,140 m.

Figure 32:
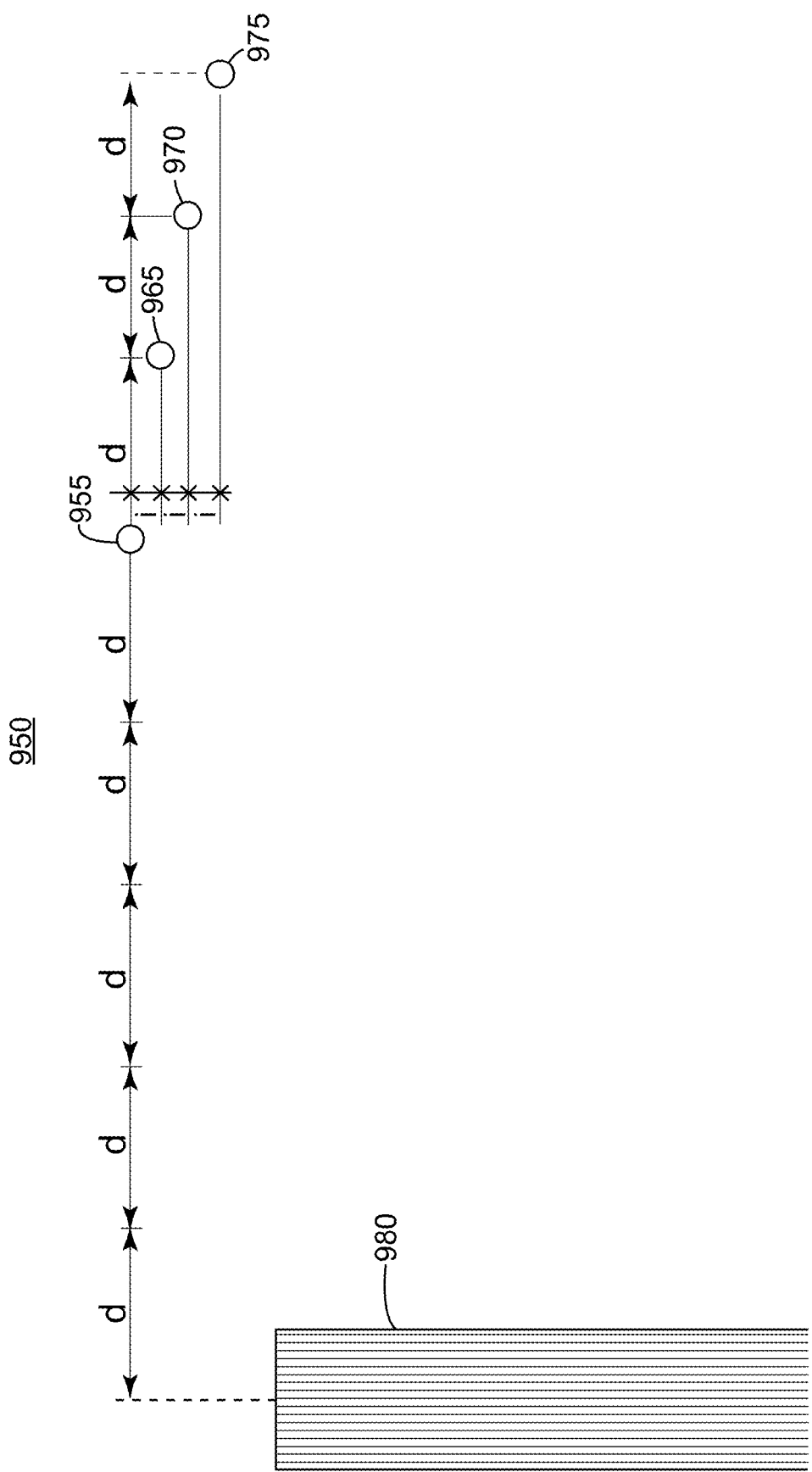
FIG. 32 is a diagram of a WAZ data acquisition system used to complement the WAZ system in FIG. 26 according to another embodiment.

In order to achieve uniform ultra-wide offset data, another survey of the same target zone may be subsequently performed with another data acquisition system 950 as illustrated in FIG. 32. System 950 includes four seismic sources, 955, 960, 965 and 970 separated by the cross-line source distance, d, and a streamer set 980 towed at a cross-line gap distance substantially equal to five times the cross-line distance d from the closest of the four seismic sources. System 950 is towed such that the streamer set 980 to sail the lines skipped by system 800. Interleaving the seismic data acquired with system 800 with the additional seismic data acquired seismic data acquisition system 950 would result in a complete coverage for all 17 tiles.

Table in FIG. 33 summarizes some of the features of the above-discussed embodiments, and also provides a comparison with the conventional WAZ system and method. Survey duration is about half as long for all the embodiments relative to survey duration when conventional WAZ data acquisition system is used. The total fold is comparable to the total fold achieved with the conventional system and method, and is even exceeded for some embodiments.

The disclosed embodiments provide methods and systems for wide azimuth data acquisition. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in particular combinations, each feature or element may be usable alone without the other features and elements of the embodiments or in other various combinations with or without other features and elements disclosed herein.

The written description uses examples of the subject matter disclosed to enable any person skilled in the art to practice the same, including making and using the described devices or systems and performing any of the described methods. The patentable scope of the subject matter is defined by the claims, and may include other examples that occur to those skilled in the art. Such examples are intended to be within the scope of the claims.

What is claimed is:

1. A method for wide azimuth seismic data acquisition, the method comprising:
towing, in an inline direction, a seismic data acquisition system including
seismic sources distributed along a cross-line direction with a predetermined step, the cross-line direction being substantially perpendicular to the inline direction,
a first streamer set and a second streamer set towed behind first and second outer seismic sources of the seismic sources, respectively, and
a third streamer set towed behind a middle seismic source among the seismic sources,
wherein the first streamer set and the first outer seismic source advance along a first inline path, the second streamer set and the second outer seismic source advance along a second inline path, and the third streamer set and the middle seismic source advance along a third inline path, the first, second and third inline paths having different cross-line positions;
activating the seismic sources; and
acquiring seismic data using detectors carried by the first, second and third streamer sets.

2. The method of claim 1, wherein
the seismic data acquisition system is towed back and forth along the inline direction, at a first heading switch, the seismic data acquisition system being shifted with a first distance in the cross-line direction, and at a second heading switch, the seismic data acquisition system being shifted with a second distance in the cross-line direction, and
a sum of the first distance and the second distance is substantially equal to the predetermined distance.

3. The method of claim 2, wherein, after switching heading for a predetermined number of times, the seismic data acquisition system is shifted, in the cross-line direction, with a third distance that is a multiple of the predetermined step.

4. The method of claim 3, wherein the predetermined number of times is one less than a number of the seismic sources.

5. The method of claim 2, wherein
each of the first, second and third streamer sets includes a predetermined number of streamers; and
a difference between the second distance and the first distance is substantially equal to half of the predetermined distance divided by the predetermined number of streamers.

6. The method of claim 2, wherein three of the seismic sources are towed between the first outer seismic source and the third middle seismic source, and three of the seismic sources are towed between the third middle seismic source and the second outer seismic source.

7. The method of claim 2, wherein the seismic data system acquires between 10 and 17 distinct offset-azimuth combinations.

8. The method of claim 7, further comprising:
towing, in the inline direction, another seismic data acquisition system including
four additional seismic sources separated by the predetermined distance in the cross-line direction, and
an additional streamer set towed at a cross-line gap distance substantially equal to five times the predetermined distance from a closest of the four additional seismic sources, in the cross-line direction;
activating the four additional seismic sources;
acquiring additional seismic data using detectors carried by the additional streamer set; and
interleaving the seismic data with the additional seismic data to achieve the 17 offset-azimuth combinations for all locations.

9. The method of claim 1, wherein at least two seismic sources among the seismic sources are activated to have overlapping listening time intervals.

10. The method of claim 9, wherein the at least two seismic sources are towed substantially at same inline level.

11. The method of claim 9, wherein one of the at least two seismic sources is not the first outer seismic source, the second outer seismic source or the third middle seismic source.

12. The method of claim 9, wherein, the third middle seismic source is towed between the at least two seismic sources in the cross-line direction.

13. The method of claim 1, wherein the seismic sources are activated at predetermined super-shot positions in the inline direction.

14. The method of claim 1, wherein
a first pair of seismic sources among the seismic sources are activated to have overlapping first listening time intervals, and
a second pair of seismic sources among the seismic sources are activated to have overlapping second listening time intervals,
wherein the third middle source is towed, in the cross-line direction, between sources of the first pair of sources and between sources of the second pair of sources.

15. The method of claim 14, wherein the sources of the first pair of sources have substantially same cross-line separation as the sources of the second pair of sources.

16. A method for seismic data acquisition, the method comprising:
towing, back and forth in an inline direction, a seismic data acquisition system including
seismic sources distributed along a cross-line direction with a predetermined step, the cross-line direction being substantially perpendicular to the inline direction,
a first streamer set and a second streamer set towed behind first and second outer seismic sources of the seismic sources, respectively, and
a third streamer set towed behind a middle seismic source among the seismic sources,
wherein the first streamer set and the first outer seismic source advance along a first inline path, the second streamer set and the second outer seismic source advance along a second inline path, and the third streamer set and the middle seismic source advance along a third inline path, the first, second and third inline paths having different cross-line positions;
activating the seismic sources such that the seismic sources to be activated at substantially same super-shot positions in the inline direction;
acquiring seismic data using detectors carried by the first, second and third streamer sets; and
shifting the seismic data acquisition system, in the cross-line direction, when switching heading, (A) a first distance that is substantially equal to a half of the predetermined cross-line distance between adjacent seismic sources for a predetermined number of times, and (B) then once a second distance that is a multiple of the predetermined cross-line distance.

17. A seismic data acquisition system configured to be towed in an inline direction, the system comprising:
seismic sources distributed along a cross-line direction with a predetermined step, the cross-line direction being substantially perpendicular to the inline direction;
a first streamer set and a second streamer set towed behind first and second outer seismic sources of the seismic sources, respectively;
a third streamer set towed behind a middle seismic source among the seismic sources,
wherein the first streamer set and the first outer seismic source advance along a first inline path, the second streamer set and the second outer seismic source advance along a second inline path, and the third streamer set and the middle seismic source advance along a third inline path, the first, second and third inline paths having different cross-line positions; and
a controller configured to activate the seismic sources at predetermined super-shot positions in the inline direction.

18. The seismic data acquisition system of claim 17, further comprising:
seismic vessels configured and coordinated to tow the seismic sources and the first, the second and the third streamer set heading parallel to the inline direction and heading anti-parallel to the inline direction, and to shift the data acquisition system with substantially equal distances in the cross-line direction when switching heading.

19. The seismic data acquisition system of claim 17, further comprising:
seismic vessels configured and coordinated to cyclically
(A) tow the seismic sources and the first, the second and the third streamer set heading parallel to the inline direction and heading anti-parallel to the inline direction for a number of times, the seismic data acquisition system being shifted, in the cross-line direction, with a distance substantially equal to half of the predetermined distance when switching heading, and, (B) shift the seismic data acquisition system, in the cross-line direction, with a skip-band distance that is substantially equal to the number of times multiplied with the predetermined step.

20. The seismic data acquisition system of claim 17, wherein geometries of the first, second and third streamer set are substantially identical, and streamers of the first, the second and the third streamer set are towed substantially symmetrical in the cross-line direction relative to a trajectory of the first outer, the second outer and the third middle seismic source, respectively.

\* \* \* \* \*